United States Patent
Mizuma et al.

(10) Patent No.: US 11,415,813 B2
(45) Date of Patent: Aug. 16, 2022

(54) OPTICAL SYSTEM AND IMAGE CAPTURING APPARATUS

(71) Applicant: CANON KABUSHIKI KAISHA, Tokyo (JP)

(72) Inventors: Akira Mizuma, Saitama (JP); Takeo Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 16/849,878

(22) Filed: Apr. 15, 2020

(65) Prior Publication Data
US 2020/0341288 A1 Oct. 29, 2020

(30) Foreign Application Priority Data
Apr. 26, 2019 (JP) .............................. JP2019-086267

(51) Int. Cl.
| | |
|---|---|
| G02B 27/64 | (2006.01) |
| G02B 9/60 | (2006.01) |
| G03B 5/00 | (2021.01) |
| G02B 9/34 | (2006.01) |
| G03B 3/00 | (2021.01) |

(52) U.S. Cl.
CPC .............. *G02B 27/646* (2013.01); *G02B 9/34* (2013.01); *G02B 9/60* (2013.01); *G03B 3/00* (2013.01); *G03B 5/00* (2013.01); *G03B 2205/0007* (2013.01)

(58) Field of Classification Search
CPC .......... G02B 27/646; G02B 9/34; G02B 9/60; G02B 9/58; G02B 9/64; G02B 13/02; G02B 15/22; G02B 15/24; G02B 15/26; G02B 15/28; G03B 3/00; G03B 5/00; G03B 2205/0007; G03B 2205/0046; G03B 3/02
USPC ........ 359/745, 746, 747, 754–760, 763–769, 359/771–780, 683, 693
See application file for complete search history.

(56) References Cited

U.S. PATENT DOCUMENTS

| | | |
|---|---|---|
| 2003/0210476 A1 | 11/2003 | Harada |
| 2006/0007342 A1 | 1/2006 | Taki |
| 2010/0321791 A1* | 12/2010 | Hayakawa ........... G02B 15/173 359/683 |

(Continued)

FOREIGN PATENT DOCUMENTS

JP 2015-215392 A 12/2015

*Primary Examiner* — Darryl J Collins
*Assistant Examiner* — Matthew Y Lee
(74) *Attorney, Agent, or Firm* — Canon U.S.A., Inc. IP Division

(57) ABSTRACT

An optical system includes an object side lens unit arranged closest to an object, immobilized in focusing, and having a positive refractive power, an image plane side lens unit arranged closest to an image plane and having a negative refractive power, and a first focus lens unit and a second focus lens unit which are arranged between the object side lens unit and the image plane side lens unit and are moved in focusing. The object side lens unit consists of a first partial unit having the negative refractive power, a second partial unit having the positive refractive power, a third partial unit having the positive or the negative refractive power which are arranged in order from an object side to an image plane side. The second partial unit is moved in a direction including a component in a perpendicular direction to an optical axis in image blur correction.

20 Claims, 19 Drawing Sheets

(56) References Cited

U.S. PATENT DOCUMENTS

| | | | | |
|---|---|---|---|---|
| 2012/0293869 A1* | 11/2012 | Hayashi | ............... | G02B 27/646 |
| | | | | 359/557 |
| 2013/0222925 A1* | 8/2013 | Onozaki | ............ | G02B 13/0055 |
| | | | | 359/692 |
| 2017/0075128 A1* | 3/2017 | Tanami | ............... | G02B 27/0025 |
| 2017/0336608 A1* | 11/2017 | Gyoda | ..................... | G02B 7/09 |

* cited by examiner

FIRST EXEMPLARY EMBODIMENT

FIRST EXEMPLARY EMBODIMENT

INFINITY

CLOSEST

FIRST EXEMPLARY
EMBODIMENT

REFERENCE STATE 0.5° IMAGE STABILIZATION STATE

SECOND EXEMPLARY EMBODIMENT

INFINITY

CLOSEST

SECOND EXEMPLARY EMBODIMENT

REFERENCE STATE 0.5° IMAGE STABILIZATION STATE

THIRD EXEMPLARY EMBODIMENT

INFINITY

CLOSEST

THIRD EXEMPLARY
EMBODIMENT

REFERENCE STATE 0.5° IMAGE STABILIZATION STATE

FOURTH EXEMPLARY EMBODIMENT

FOURTH EXEMPLARY EMBODIMENT

INFINITY

CLOSEST

FOURTH EXEMPLARY
EMBODIMENT

REFERENCE STATE 0.5° IMAGE STABILIZATION STATE

FIFTH EXEMPLARY EMBODIMENT

FIFTH EXEMPLARY EMBODIMENT

INFINITY

CLOSEST

FIFTH EXEMPLARY
EMBODIMENT

REFERENCE STATE 0.5° IMAGE STABILIZATION STATE

SIXTH EXEMPLARY
EMBODIMENT

INFINITY

CLOSEST

SIXTH EXEMPLARY
EMBODIMENT

REFERENCE STATE 0.5° IMAGE STABILIZATION STATE

OPTICAL SYSTEM AND IMAGE CAPTURING APPARATUS

BACKGROUND OF THE INVENTION

Field of the Invention

The aspect of the embodiments relates to an optical system and an image capturing apparatus.

Description of the Related Art

Macro lenses are known as lenses capable of close-up imaging. A macro lens is expected to have high optical performance for imaging an object in a close distance where an imaging magnification is 0.5 times or more, so that a floating method for moving a plurality of lens units in focusing is often adopted to reduce an aberration fluctuation.

Further, in a case of a macro lens, imaging is often performed while reducing an aperture diameter of an aperture stop so as to secure a deep depth of field. Accordingly, a shutter speed is reduced, so that imaging is likely to be affected by a vibration such as hand shake, and an image quality of a captured image is likely to be deteriorated.

United States Patent Application Publication No. 2003/0210476 and Japanese Patent Application Laid-Open No. 2015-215392 discuss optical systems which adopt the floating method and move some of lens units to correct image blurring.

SUMMARY OF THE INVENTION

According to an aspect of the embodiments, an optical system includes an object side lens unit which is arranged closest to an object, is immobilized in focusing, and has a positive refractive power, an image plane side lens unit which is arranged closest to an image plane and has a negative refractive power, and a first focus lens unit and a second focus lens unit which are arranged between the object side lens unit and the image plane side lens unit and are moved in focusing, wherein a distance between adjacent lens units is changed in focusing. The object side lens unit consists of a first partial unit having a negative refractive power, a second partial unit having a positive refractive power, and a third partial unit having a positive or a negative refractive power which are arranged in order from an object side to an image plane side. The second partial unit is moved in a direction including a component in a perpendicular direction with respect to an optical axis in image blur correction.

According to another aspect of the embodiments, an apparatus includes an optical system, and an image pickup element which receives light of an image formed by the optical system. The optical system includes an object side lens unit which is arranged closest to an object, is immobilized in focusing, and has a positive refractive power, an image plane side lens unit which is arranged closest to an image plane and has a negative refractive power, and a first focus lens unit and a second focus lens unit which are arranged between the object side lens unit and the image plane side lens unit and are moved in focusing. A distance between adjacent lens units is changed in focusing. The object side lens unit consists of a first partial unit having the negative refractive power, a second partial unit having the positive refractive power, and a third partial unit having the positive or the negative refractive power which are arranged in order from an object side to an image plane side. The second partial unit is moved in a direction including a component in a perpendicular direction with respect to an optical axis in image blur correction.

Further features of the disclosure will become apparent from the following description of exemplary embodiments with reference to the attached drawings.

DESCRIPTION OF THE EMBODIMENTS

Figure 1:
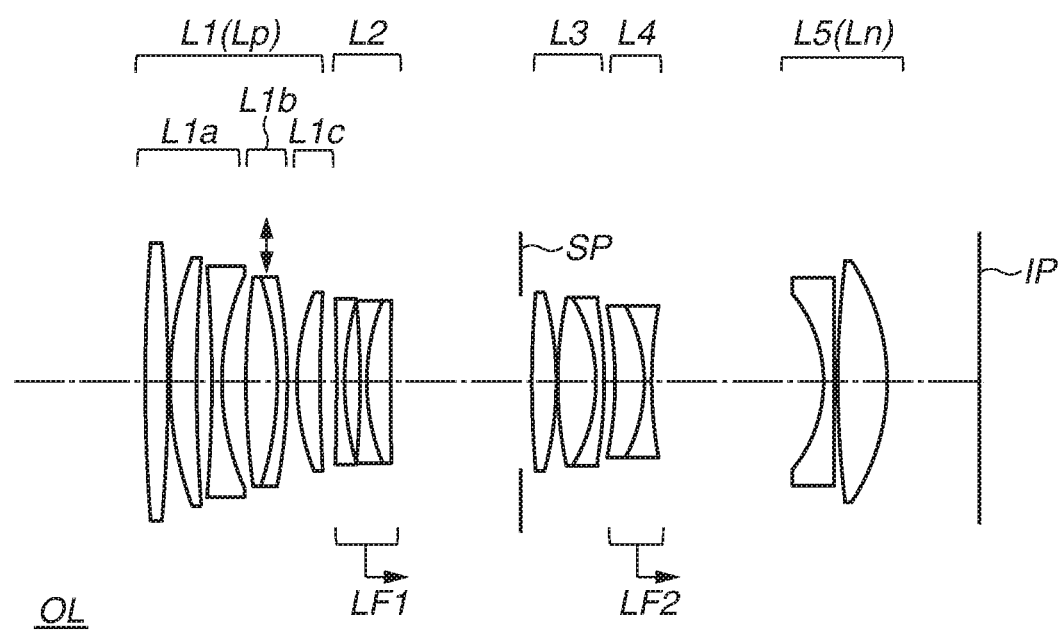
FIG. 1 is a cross-sectional view of an optical system according to a first exemplary embodiment.

An optical system and an image capturing apparatus according to exemplary embodiments of the disclosure will be described in detail below with reference to the attached drawings.

Exemplary Embodiment of Optical System

An optical system according to each of the exemplary embodiments is an imaging optical system which is used for an image capturing apparatus such as a digital still camera, a broadcasting camera, a silver-halide film camera, and a monitoring camera.

In each cross-sectional view of an optical system OL illustrated in FIGS. 1, 4, 7, 10, 13, and 16, a left side is an object side (a front side), and a right side is an image plane side (a rear side). Further, "Li" indicates an i-th lens unit, where "i" is an order of a lens unit from an object to an image plane in each cross-sectional view. A distance between adjacent lens units is changed in focusing. An aperture stop SP determines (restricts) a light flux of a full aperture F-number. In focusing from infinity to a closest distance, focus lens units are moved as indicated by solid arrows in the drawings.

In a case where the optical system OL according to each of the exemplary embodiments is used in a digital still camera and a broadcasting camera, an image plane IP corresponds to an imaging plane of an image pickup element (a photoelectric conversion element) such as a charge coupled device (CCD) sensor and a complementary metal oxide semiconductor (CMOS) sensor. In a case where the optical system OL according to each of the exemplary embodiments is used in a silver-halide film camera, the image plane IP corresponds to a film surface.

FIGS. 2A, 2B, 5A, 5B, 8A, 8B, 11A, 11B, 14A, 14B, 17A, and 17B are longitudinal aberration diagrams of the optical systems OL according to the respective exemplary embodiments. In spherical aberration diagrams, "Fno" is an F-number. In the spherical aberration diagrams, solid lines indicate d-lines (wavelength of 587.6 nm), and long dashed double-dotted lines indicate g-lines (wavelength of 435.8 nm). In astigmatism diagrams, dashed lines M indicate aberration amounts on meridional image planes, and solid lines S indicate aberration amounts on sagittal image planes. In the distortion diagrams, d-lines indicate distortion aberrations. Chromatic aberrations of magnification are indicated by g-lines in the chromatic aberration diagrams. "ω" is a half angle of view (degrees).

FIGS. 3A, 3B, 6A, 6B, 9A, 9B, 12A, 12B, 15A, 15B, 18A, and 18B are lateral aberration diagrams of the optical systems OL according to the respective exemplary embodiments. Solid lines indicate d-lines (wavelength of 587.6 nm), long dashed double-dotted lines indicate g-lines (wavelength of 435.8 nm), and dashed dotted lines indicate F-lines (wavelength of 486.1 nm).

In the present specification, a "lens unit" may include a plurality of lenses or a single lens. "Back focus" is a length expressing a distance from a final surface of the optical system OL (a surface closest to the image plane) to the image plane IP on an optical axis in terms of an air conversion length. An "overall lens length" is a length obtained by adding the back focus to a distance from a foremost surface of the optical system OL (a surface closest to the object) to the final surface on the optical axis.

In order to obtain an optical system which is beneficial to size reduction of a lens barrel and can satisfactorily correct image blur in an entire focus range even in close-up imaging, arrangement and a sign of a refractive power of a lens element which is moved in a direction including a component in a perpendicular direction with respect to the optical axis in the image blur correction are important.

Therefore, in the optical system OL according to the aspect of the embodiments, a distance between adjacent lens units is changed in focusing. The optical system OL according to the disclosure includes an object side lens unit Lp having a positive refractive power arranged closest to an object and an image plane side lens unit Ln having a negative refractive power arranged closest to an image plane. The optical system OL further includes a first focus lens unit LF1 and a second focus lens unit LF2 which are arranged between the object side lens unit Lp and the image plane side lens unit Ln and are moved in focusing.

The object side lens unit Lp is immobilized in focusing.

The object side lens unit Lp consists of a first partial unit L1a having the negative refractive power, a second partial unit L1b having the positive refractive power, and a third partial unit L1c having the positive or negative refractive power which are arranged in order from the object side to the image plane side. The second partial unit L1b is moved in a direction including a component in the perpendicular direction with respect to the optical axis in image blur correction.

Since the optical system OL has the configuration for correcting image blur by a part of the object side lens unit Lp, a driving mechanism for moving the second partial unit L1b can be arranged separated from a driving mechanism for driving the aperture stop SP, a driving mechanism for driving the first focus lens unit LF1 and the second focus lens unit LF2. Accordingly, the lens barrel including the optical system OL can be easily reduced in size.

The object side lens unit Lp is immobilized in focusing, and thus variation in an aberration fluctuation associated with the image blur correction based on a focus position can be reduced.

In the object side lens unit Lp, signs of the refractive powers are different in the first partial unit L1a and the second partial unit L1b. Accordingly, the configuration can prevent image shaking sensitivity (an image blur correction amount per unit movement amount (a movement amount of an image point)) of the second partial unit L1b from becoming too small compared with a case in which the object side lens unit Lp includes only the partial units having the refractive powers with the same sign. If desired image shaking sensitivity can be secured, a maximum movement amount of the second partial unit L1b can be reduced, and the driving mechanism of the second partial unit L1b can be configured in a small size. Accordingly, the lens barrel including the optical system OL can be easily reduced in size.

In the object side lens unit Lp, if the first partial unit L1a having the negative refractive power is arranged on the object side of the second partial unit L1b having the positive refractive power, a light beam incident on the second partial unit L1b can be easily set nearly afocal. Accordingly, a variation of an incident angle of the light beam incident on the second partial unit L1b can be reduced at the time of the image blur correction, and particularly a fluctuation of coma aberration can be reduced.

Further, if the third partial unit L1c is arranged on the image plane side of the second partial unit L1b, it becomes easy to appropriately set the image shaking sensitivity of the second partial unit L1b and to correct aberrations generated by the first partial unit L1a and the second partial unit L1b.

Since the floating method is adopted for moving the first focus lens unit LF1 and the second focus lens unit LF2 along an optical axis direction, an aberration fluctuation can be reduced in focusing.

Further, if the image plane side lens unit Ln having the negative refractive power is arranged closest to the image plane, the optical system OL attains a telephoto type refractive power arrangement. Accordingly, an overall length of the optical system OL can be reduced.

If the optical system OL is configured as described above, it is beneficial to size reduction of the lens barrel. Further, the optical system OL can satisfactorily correct image blur in the entire focus range even in close-up imaging In one embodiment, the optical system OL satisfies one or more of inequalities (1) to (8). The optical system OL satisfies one or more of the inequalities (1) to (8) and can further obtain the above-described effects.

$$0.50 < |(1-\beta is)\beta r| < 2.00 \quad (1)$$

$$0.60 < Dis/DL < 1.00 \quad (2)$$

$$-5.00 < FL1a/FL1b < -1.00 \quad (3)$$

$$-2.00 < fn/f < 0.00 \quad (4)$$

$$0.20 < fm/f < 0.60 \quad (5)$$

$$0.30 < fp/f < 0.80 \quad (6)$$

$$0.30 < ff1/ff2 < 1.00 \quad (7)$$

$$\beta \leq -0.50 \quad (8)$$

In the inequalities (1) to (8), "βis" is a lateral magnification of the second partial unit L1b, and "βr" is a composite lateral magnification of all lenses arranged on the image plane side of the second partial unit L1b at a time of focusing on an object at infinity. "Dis" is a distance on the optical axis from a lens surface of the second partial unit L1b on the image plane side thereof to the image plane, and "DL" is a distance on the optical axis from a lens surface on the object side of the object side lens unit Lp to the image plane. "FL1a" is a focal length of the first partial unit L1a, and "FL1b" is a focal length of the second partial unit L1b. "fp" is a focal length of the object side lens unit Lp, "fn" is a focal length of the image plane side lens unit Ln, and "f" is a focal length of the optical system OL.

"fm" is a focal length of an intermediate lens unit which has the positive refractive power and is arranged between the first focus lens unit LF1 and the second focus lens unit LF2. "ff1" is a focal length of the first focus lens unit LF1, and "ff2" is a focal length of the second focus lens unit LF2. The second focus lens unit LF2 is arranged on the image plane side of the first focus lens unit LF1, and signs of the refractive powers of the first focus lens unit LF1 and the second focus lens unit LF2 are the same. "β" is a lateral magnification of the optical system OL at a time of focusing on an object at the closest distance.

The inequality (1) defines image shaking sensitivity. In a case where the image shaking sensitivity is less than a lower limit value of the inequality (1), a movement amount of the second partial unit L1b becomes larger to obtain a fixed image blur correction amount, and the driving mechanism of the second partial unit L1b is increased in size. This is not desirable because it is difficult to reduce the size of the lens barrel including the optical system OL. In a case where the image shaking sensitivity is greater than an upper limit value of the inequality (1), the movement amount of the second partial unit L1b becomes too small to obtain the fixed image blur correction amount, and it is difficult to accurately move the second partial unit L1b electrically and mechanically. Therefore, it is not desirable because it is difficult to satisfactorily correct image blur.

The inequality (2) defines an arrangement of the second partial unit L1b. In a case where the second partial unit L1b is arranged on a side closer to the image plane IP such that the variable is less than a lower limit value of the inequality (2), the driving mechanism of the second partial unit L1b is disposed closer to the driving mechanisms of the aperture stop SP, the first focus lens unit LF1, the second focus lens unit LF2, and the like. In this case, it is not desirable because it is difficult to reduce the size of the lens barrel including the optical system OL. Further, in a case where the second partial unit L1b is arranged at a position too close to the image plane IP, magnetism generated from the driving mechanism of the second partial unit L1b affects an image pickup element arranged on the image plane IP and the like and tends to deteriorate a captured image, so that it is not desirable. It is physically difficult to arrange the second partial unit L1b at a position at which the variable is greater than an upper limit value of the inequality (2).

The inequality (3) defines a relationship between the focal length of the first partial unit L1a and the focal length of the second partial unit L1b. In both cases where the variable is less than a lower limit value of the inequality (3) and is greater than an upper limit value of the inequality (3), a variation of the incident angle of the light beam incident on the second partial unit L1b tends to be large in correction of image blur caused by movement of the second partial unit L1b. Therefore, the fluctuation of coma aberration becomes especially large, and it is not desirable because it is difficult to obtain high optical performance in the image blur correction.

The inequality (4) defines a relationship between the focal length of the image plane side lens unit Ln and the focal length of the optical system OL. In a case where an absolute value of the focal length of the image plane side lens unit Ln is large such that the variable is less than a lower limit value of the inequality (4), and the refractive power of the image plane side lens unit Ln becomes weaker, it is difficult to attain the telephoto type refractive power arrangement. Therefore, it is not desirable because the overall lens length is elongated, and the optical system OL is increased in size. In a case where the absolute value of the focal length of the image plane side lens unit Ln is small such that the variable is greater than an upper limit value of the inequality (4), the refractive power of the image plane side lens unit Ln becomes stronger. An on-axis light beam and an off-axis light beam are dispersed in a direction perpendicular to the optical axis on the image plane side of the image plane side lens unit Ln, and thus the image plane side lens unit Ln largely refracts only the off-axis light beam. It is thus not desirable because it is difficult to correct especially field curvature.

The inequality (5) defines a relationship between the focal length of the intermediate lens unit and the focal length of the optical system OL. In a case where the focal length of the intermediate lens unit is shortened such that the variable is less than a lower limit value of the inequality (5), and the refractive power of the intermediate lens unit becomes stronger, it is not desirable because it is difficult to correct various aberrations such as a spherical aberration and a coma aberration. In a case where the focal length of the intermediate lens unit is elongated such that the variable is greater than an upper limit value of the inequality (5), and the refractive power of the intermediate lens unit becomes weaker, it is not desirable because the overall lens length is elongated, and the optical system OL is increased in size.

The inequality (6) defines a relationship between the focal length of the object side lens unit Lp and the focal length of the optical system OL. In a case where the focal length of the object side lens unit Lp is shortened such that the variable is less than a lower limit value of the inequality (6), and the refractive power of the object side lens unit Lp becomes stronger, it is not desirable because it is difficult to correct various aberrations such as the spherical aberration and the coma aberration. In a case where the focal length of the object side lens unit Lp is elongated such that the variable is greater than an upper limit value of the inequality (6), and the refractive power of the object side lens unit Lp becomes weaker, it is difficult to attain the telephoto type refractive power arrangement. Therefore, it is not desirable because the overall lens length is elongated, and the optical system OL is increased in size.

The inequality (7) defines a relationship between the respective focal lengths of the first focus lens unit LF1 and the second focus lens unit LF2 in a case where the refractive power of the first focus lens unit LF1 has the same sign as the refractive power of the second focus lens unit LF2, and the second focus lens unit LF2 is arranged on the image plane side of the first focus lens unit LF1. The refractive power of the first focus lens unit LF1 arranged on the object side in the optical system OL is stronger than that of the second focus lens unit LF2, and thus the overall lens length of the optical system OL can be shortened.

In a case where the focal length of the first focus lens unit LF1 is shorter than the focal length of the second focus lens unit LF2 such that the variable is less than a lower limit value of the inequality (7), the refractive power of the first focus lens unit LF1 is stronger than the refractive power of the second focus lens unit LF2. It is not desirable because it is difficult to correct the spherical aberration and the coma aberration especially at a close distance. In a case where the focal length of the first focus lens unit LF1 is longer than the focal length of the second focus lens unit LF2 such that the variable is greater than an upper limit value of the inequality (7), the refractive power of the second focus lens unit LF2 is stronger than the refractive power of the first focus lens unit LF1. This case is also not desirable because it is difficult to correct the spherical aberration and the coma aberration especially at a close distance. In a case where the intermediate lens unit is arranged between the first focus lens unit LF1 and the second focus lens unit LF2, the refractive power of the intermediate lens unit also becomes stronger, so that correction of the spherical aberration and the coma aberration is more likely to be difficult.

The inequality (8) defines a desirable lateral magnification (an imaging magnification) of the optical system OL.

In a case where the lateral magnification is greater than an upper limit value of the inequality (8) (an absolute value of the lateral magnification is small), it is not desirable because it is difficult to perform close-up imaging.

In one embodiment, the numerical ranges of the inequalities (1) to (8) are set as follows.

$$0.60 < |(1-\beta is)\beta r| < 1.50 \tag{1a}$$

$$0.70 < Dis/DL < 0.95 \tag{2a}$$

$$-3.50 < FL1a/FL1b < -1.30 \tag{3a}$$

$$-1.70 < fn/f < -0.20 \tag{4a}$$

$$0.28 < fm/f < 0.55 \tag{5a}$$

$$0.40 < fp/f < 0.70 \tag{6a}$$

$$0.35 < ff1/ff2 < 0.85 \tag{7a}$$

$$\beta \leq -0.60 \tag{8a}$$

In another embodiment, the numerical ranges of the inequalities (1) to (8) are set as follows.

$$0.70 < |(1-\beta is)\beta r| < 1.40 \tag{1b}$$

$$0.80 < Dis/DL < 0.90 \tag{2b}$$

$$-3.00 < FL1a/FL1b < -1.50 \tag{3b}$$

$$-1.50 < fn/f < -0.30 \tag{4b}$$

$$0.30 < fm/f < 0.50 \tag{5b}$$

$$0.45 < fp/f < 0.60 \tag{6b}$$

$$0.40 < ff1/ff2 < 0.80 \tag{7b}$$

$$\beta \leq -0.70 \tag{8b}$$

Further, in one embodiment, the third partial unit L1c has the positive refractive power. Accordingly, it becomes easier to adjust image shaking sensitivity by the positive refractive power of the third partial unit L1c while securing the image shaking sensitivity of the second partial unit L1b by the negative refractive power of the first partial unit L1a.

Also, the second partial unit L1b includes a single positive lens and a single negative lens. Accordingly, a fluctuation of an axial chromatic aberration can be reduced in the image blur correction.

In one embodiment, the optical system OL includes the first focus lens unit LF1 and the second focus lens unit LF2 which have the negative refractive power and an intermediate lens unit (third lens unit L3) which is arranged between the first focus lens unit LF1 and the second focus lens unit LF2. With such arrangement of the refractive powers, it is easier to obtain the optical system of which the overall lens length and back focus are short.

The optical systems OL according to the specific exemplary embodiments are described below.

Figure 2A:
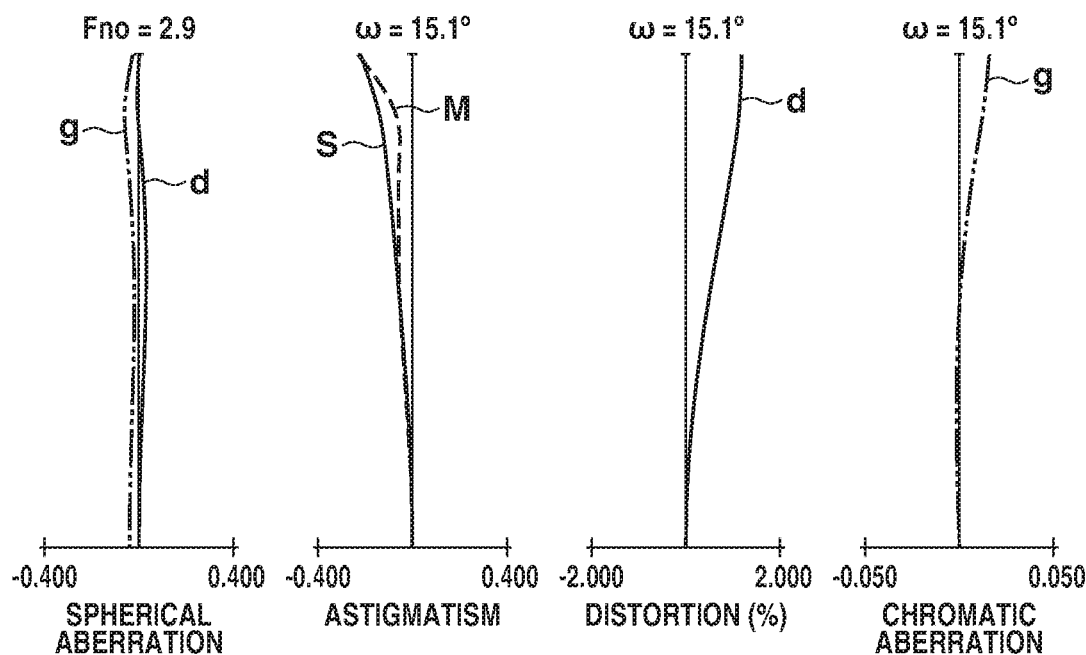
FIGS. 2A and 2B are longitudinal aberration diagrams of the optical system according to the first exemplary embodiment.
Figure 2B:
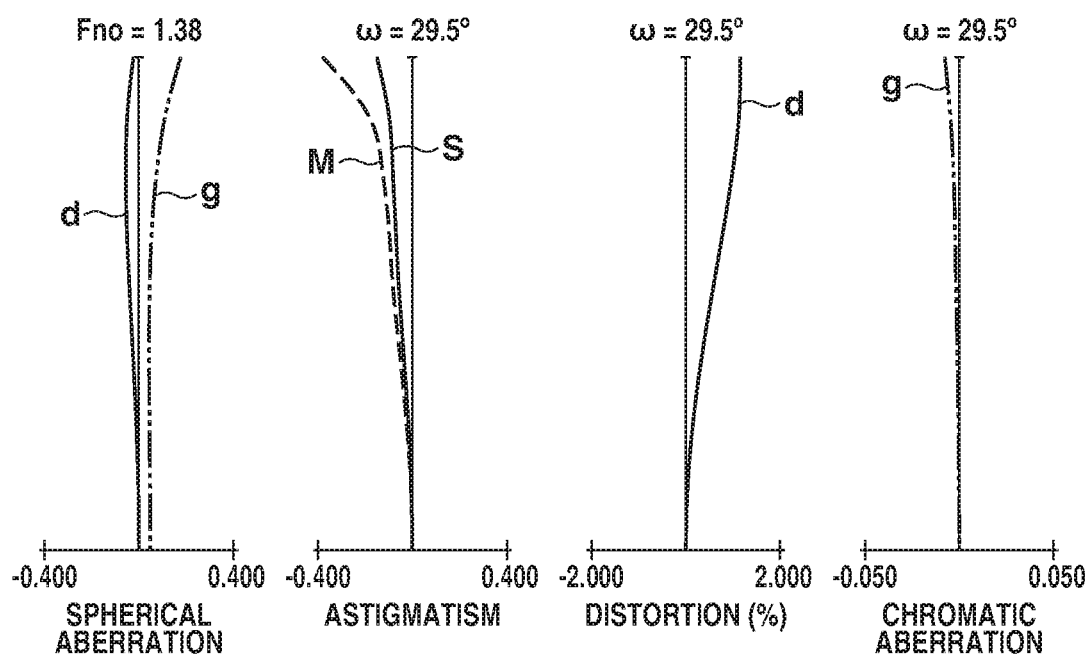
Figure 3A:
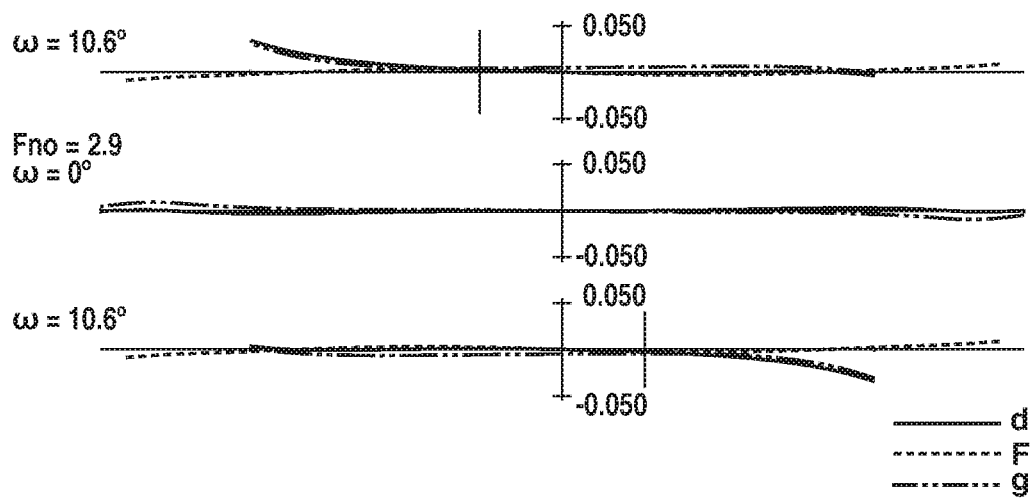
FIGS. 3A and 3B are lateral aberration diagrams of the optical system according to the first exemplary embodiment.
Figure 3B:
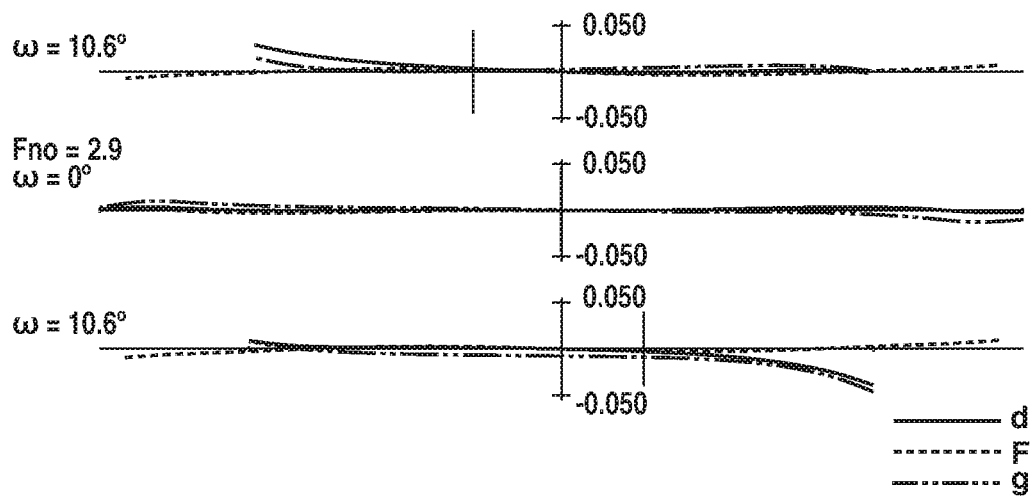

FIG. 1 is a cross-sectional view of the optical system OL according to a first exemplary embodiment at a time of focusing on an object at infinity. FIGS. 2A and 2B are longitudinal aberration diagrams of the optical system OL according to the first exemplary embodiment respectively at a time of focusing on an object at infinity and at a time of focusing on an object at the closest distance. FIGS. 3A and 3B are lateral aberration diagrams of the optical system OL according to the first exemplary embodiment respectively without correcting image blur and with correcting image blur in a correction angle of 0.5 degrees.

Figure 4:
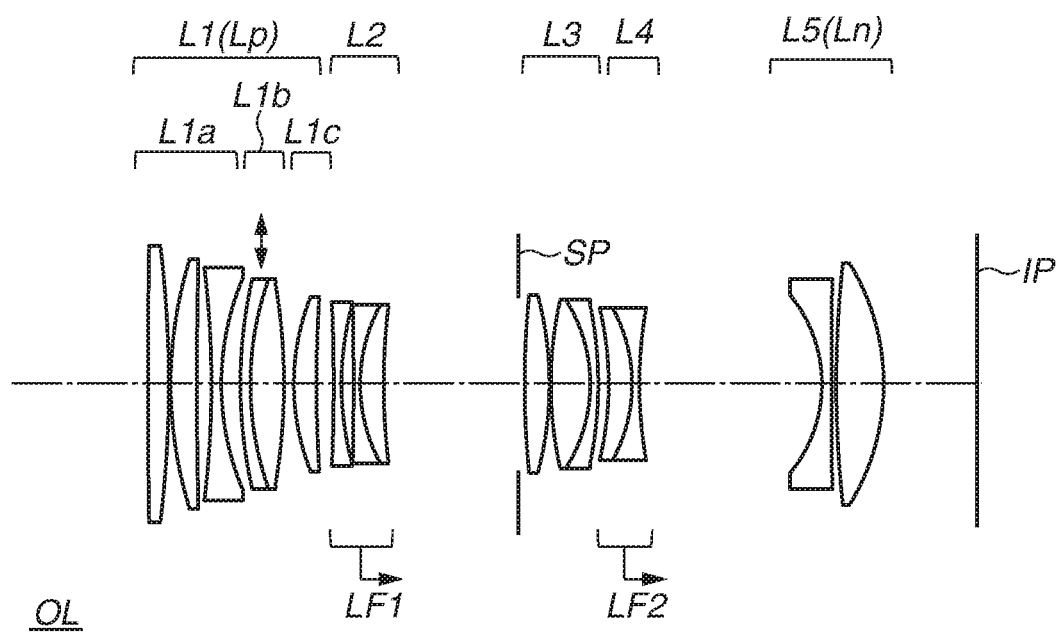
FIG. 4 is a cross-sectional view of an optical system according to a second exemplary embodiment.
Figure 5A:
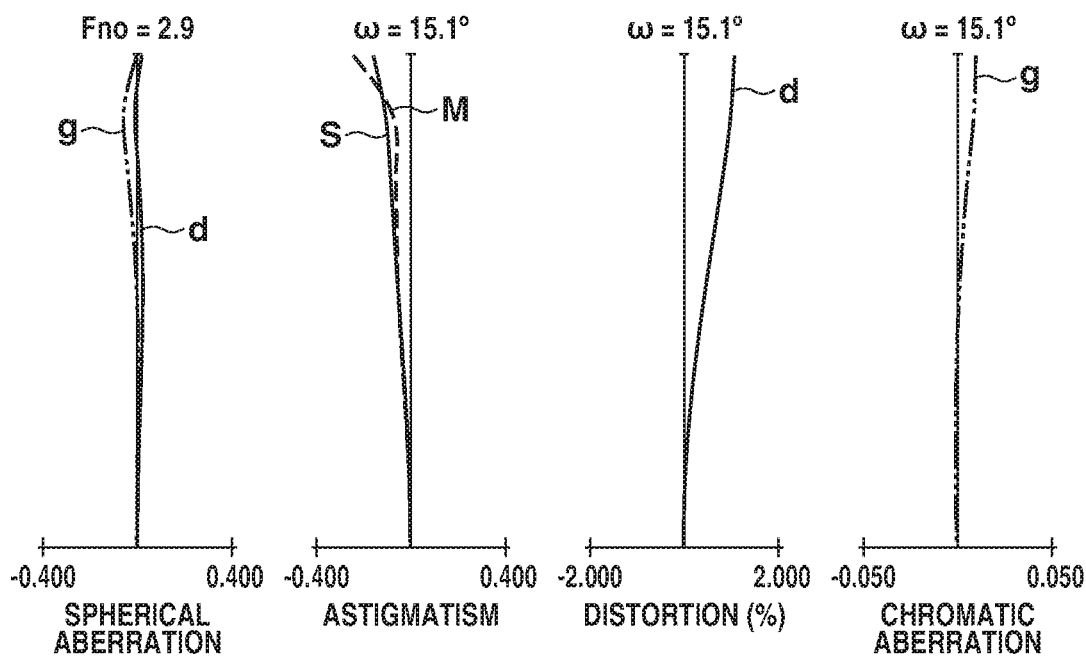
FIGS. 5A and 5B are longitudinal aberration diagrams of the optical system according to the second exemplary embodiment.
Figure 5B:
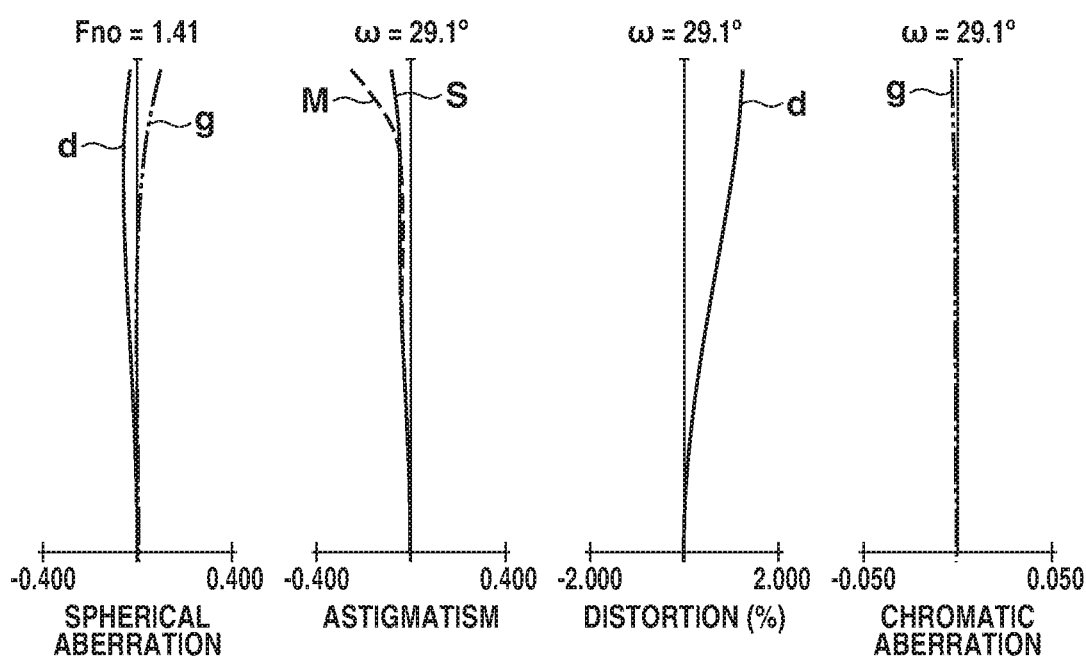
Figure 6A:
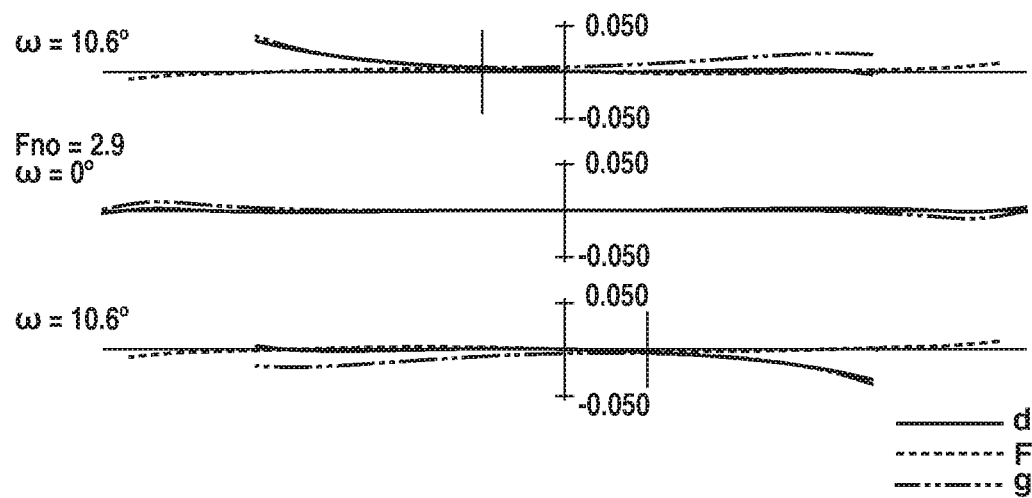
FIGS. 6A and 6B are lateral aberration diagrams of the optical system according to the second exemplary embodiment.
Figure 6B:
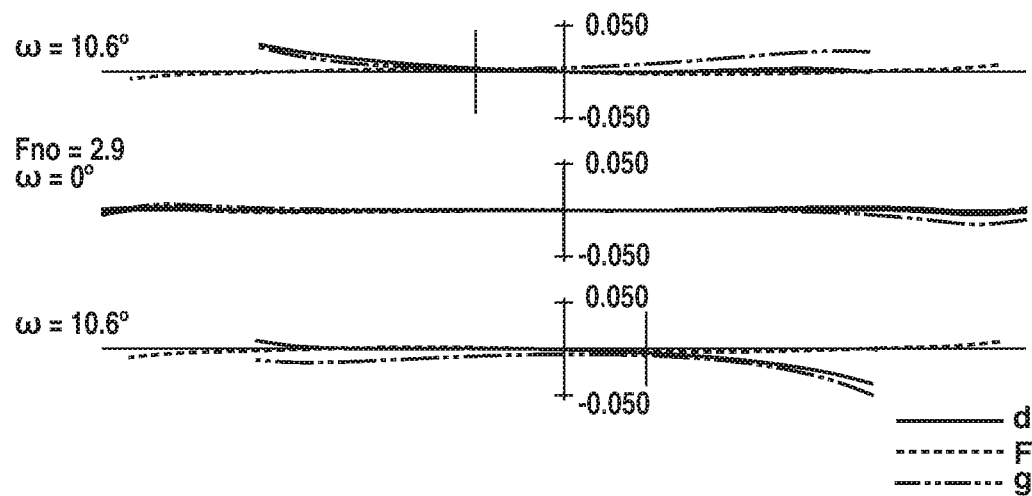

FIG. 4 is a cross-sectional view of the optical system OL according to a second exemplary embodiment at a time of focusing on an object at infinity. FIGS. 5A and 5B are longitudinal aberration diagrams of the optical system OL according to the second exemplary embodiment respectively at a time of focusing on an object at infinity and at a time of focusing on an object at the closest distance. FIGS. 6A and 6B are lateral aberration diagrams of the optical system OL according to the second exemplary embodiment respectively without correcting image blur and with correcting image blur in a correction angle of 0.5 degrees.

Figure 7:
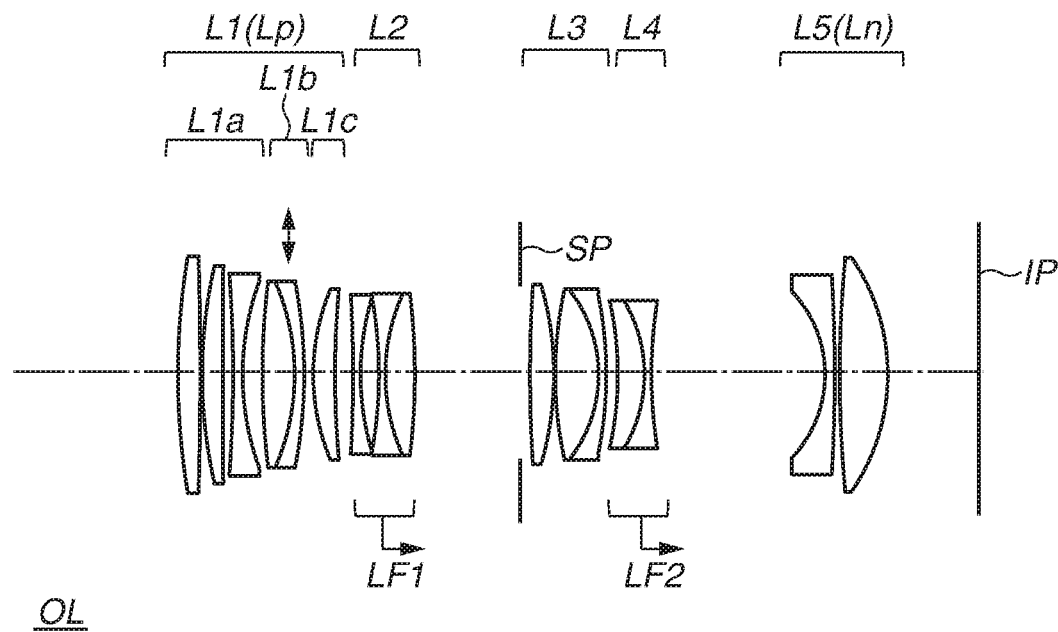
FIG. 7 is a cross-sectional view of an optical system according to a third exemplary embodiment.
Figure 8A:
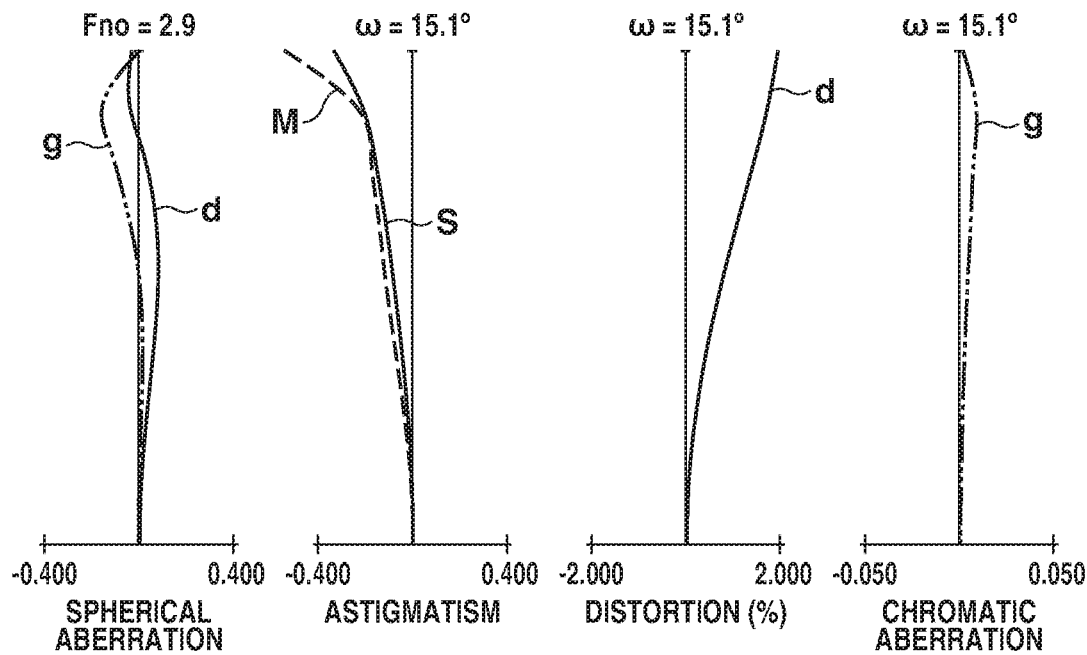
FIGS. 8A and 8B are longitudinal aberration diagrams of the optical system according to the third exemplary embodiment.
Figure 8B:
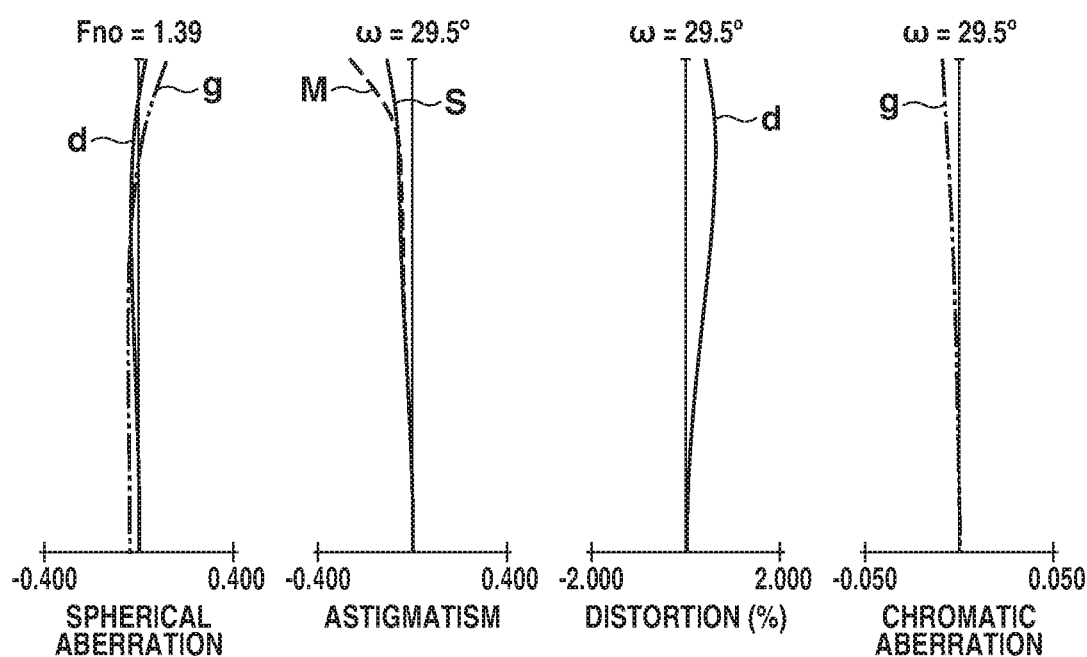
Figure 9A:
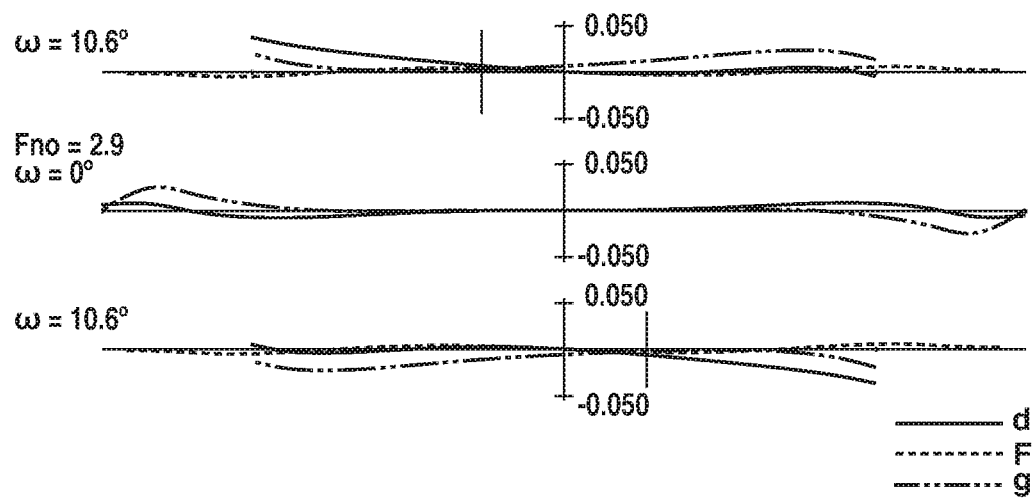
FIGS. 9A and 9B are lateral aberration diagrams of the optical system according to the third exemplary embodiment.
Figure 9B:
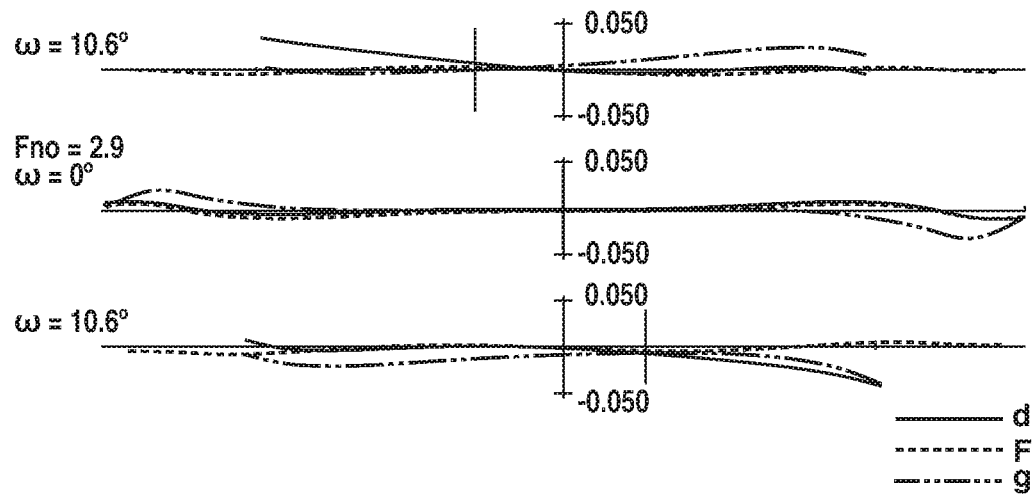

FIG. 7 is a cross-sectional view of the optical system OL according to a third exemplary embodiment at a time of focusing on an object at infinity. FIGS. 8A and 8B are longitudinal aberration diagrams of the optical system OL according to the third exemplary embodiment respectively at a time of focusing on an object at infinity and at a time of focusing on an object at the closest distance. FIGS. 9A and 9B are lateral aberration diagrams of the optical system OL according to the third exemplary embodiment respectively without correcting image blur and with correcting image blur in a correction angle of 0.5 degrees.

Figure 10:
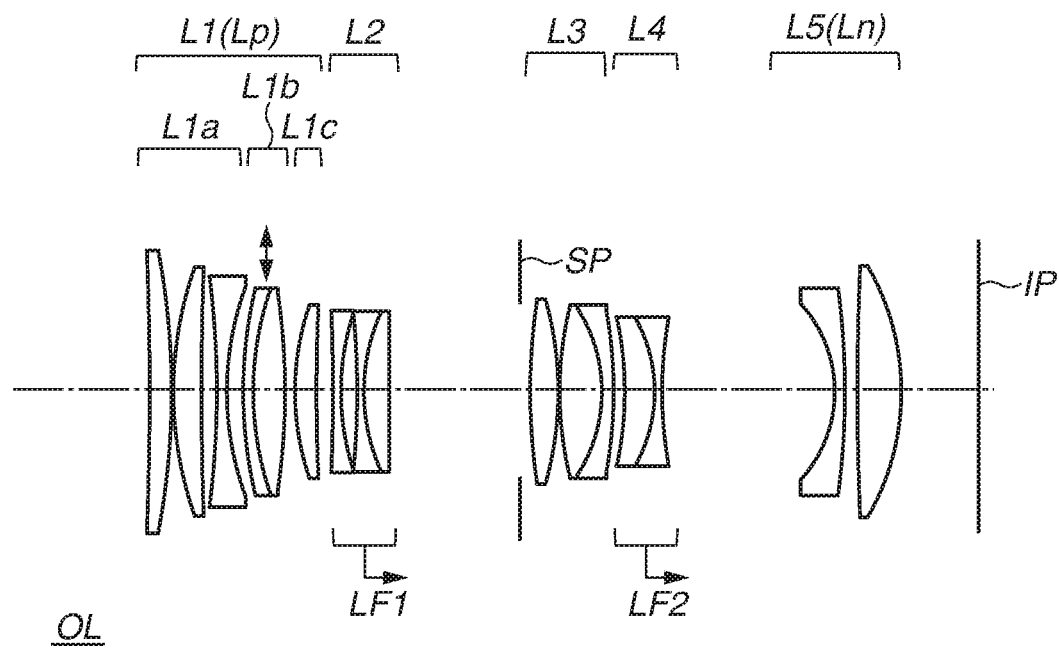
FIG. 10 is a cross-sectional view of an optical system according to a fourth exemplary embodiment.
Figure 11A:
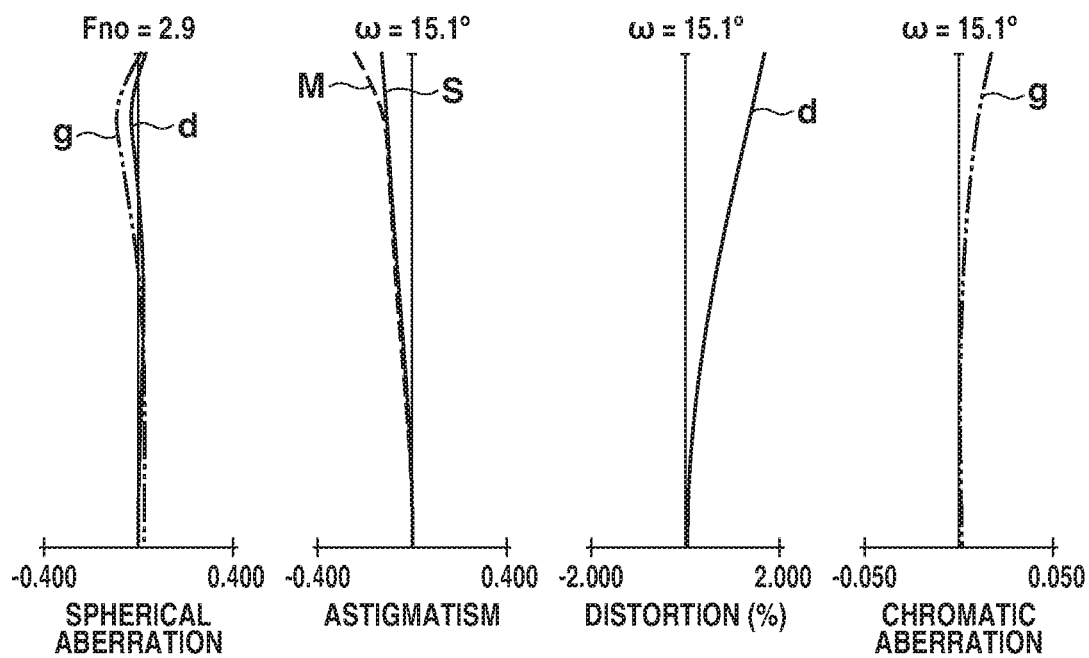
FIGS. 11A and 11B are longitudinal aberration diagrams of the optical system according to the fourth exemplary embodiment.
Figure 11B:
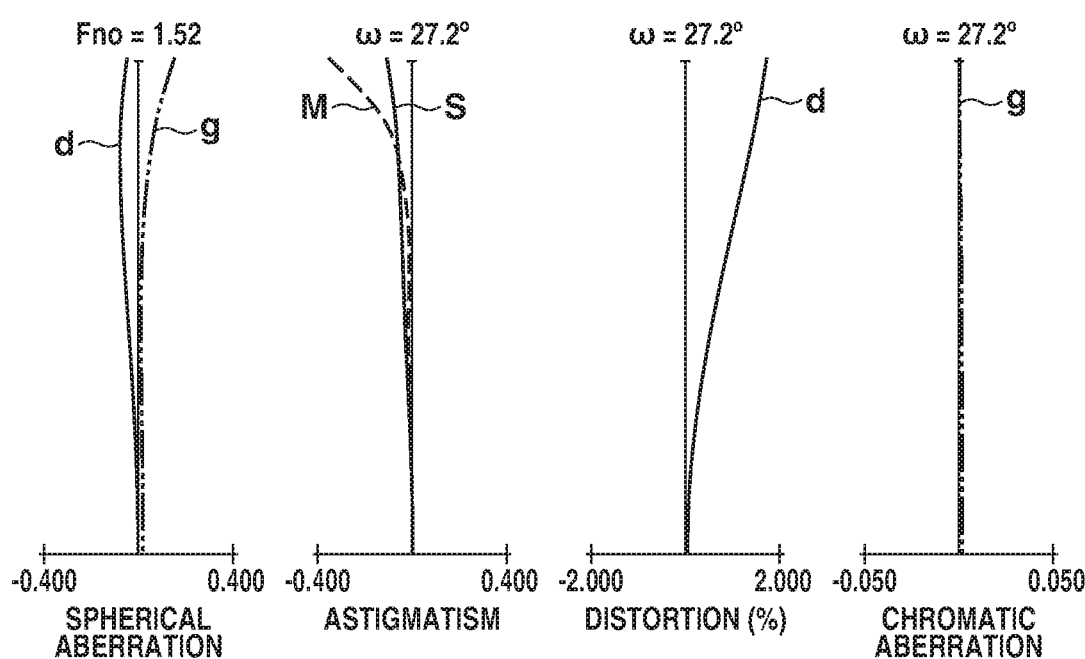
Figure 12A:
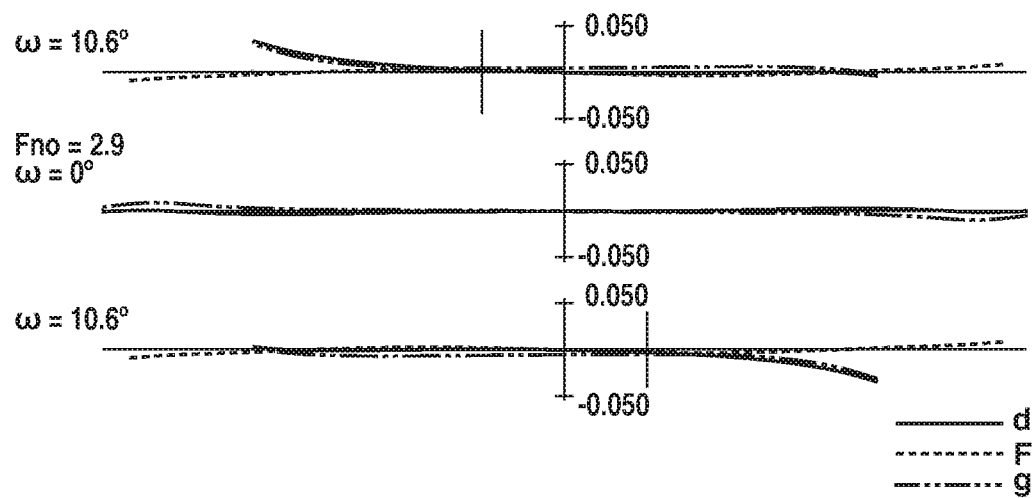
FIGS. 12A and 12B are lateral aberration diagrams of the optical system according to the fourth exemplary embodiment.
Figure 12B:
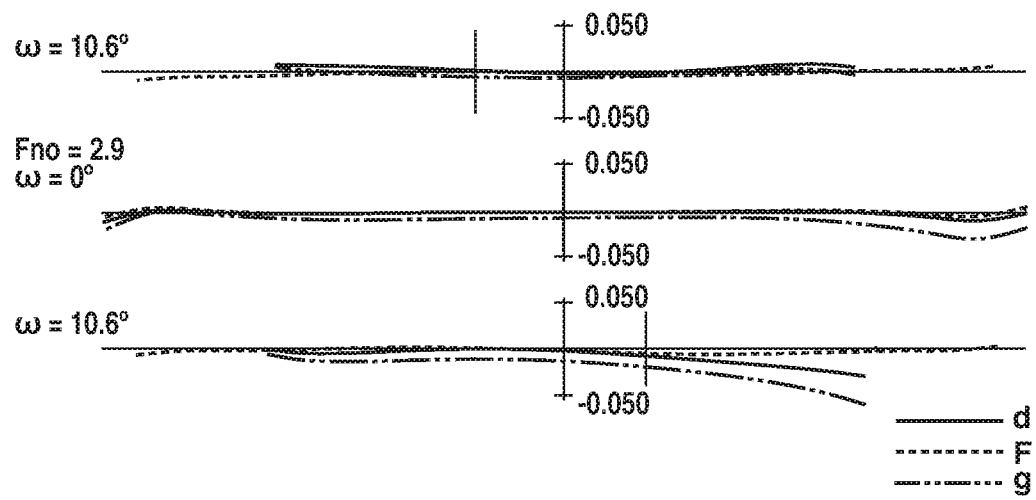

FIG. 10 is a cross-sectional view of the optical system OL according to a fourth exemplary embodiment at a time of focusing on an object at infinity. FIGS. 11A and 11B are longitudinal aberration diagrams of the optical system OL according to the fourth exemplary embodiment respectively at a time of focusing on an object at infinity and at a time of focusing on an object at the closest distance. FIGS. 12A and 12B are lateral aberration diagrams of the optical system OL according to the fourth exemplary embodiment respectively without correcting image blur and with correcting image blur in a correction angle of 0.5 degrees.

Figure 13:
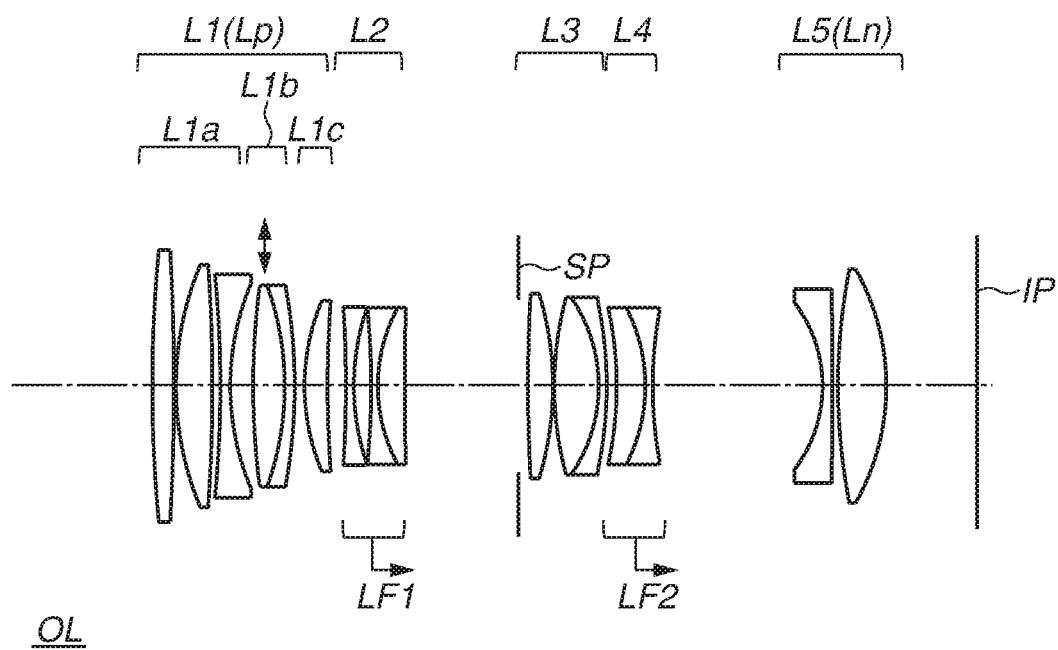
FIG. 13 is a cross-sectional view of an optical system according to a fifth exemplary embodiment.
Figure 14A:
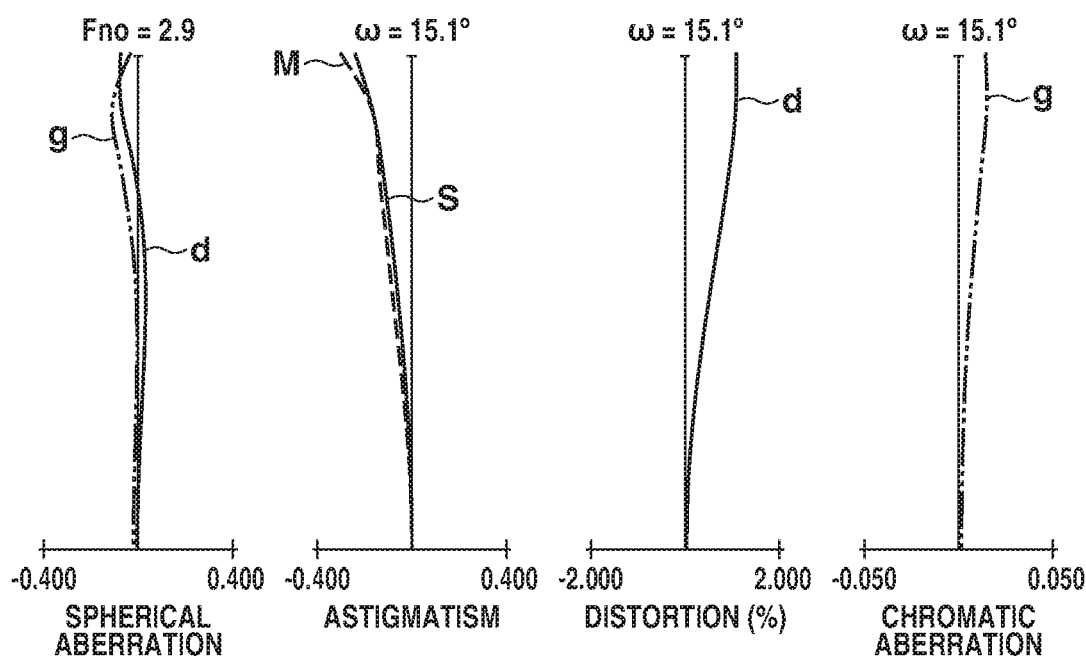
FIGS. 14A and 14B are longitudinal aberration diagrams of the optical system according to the fifth exemplary embodiment.
Figure 14B:
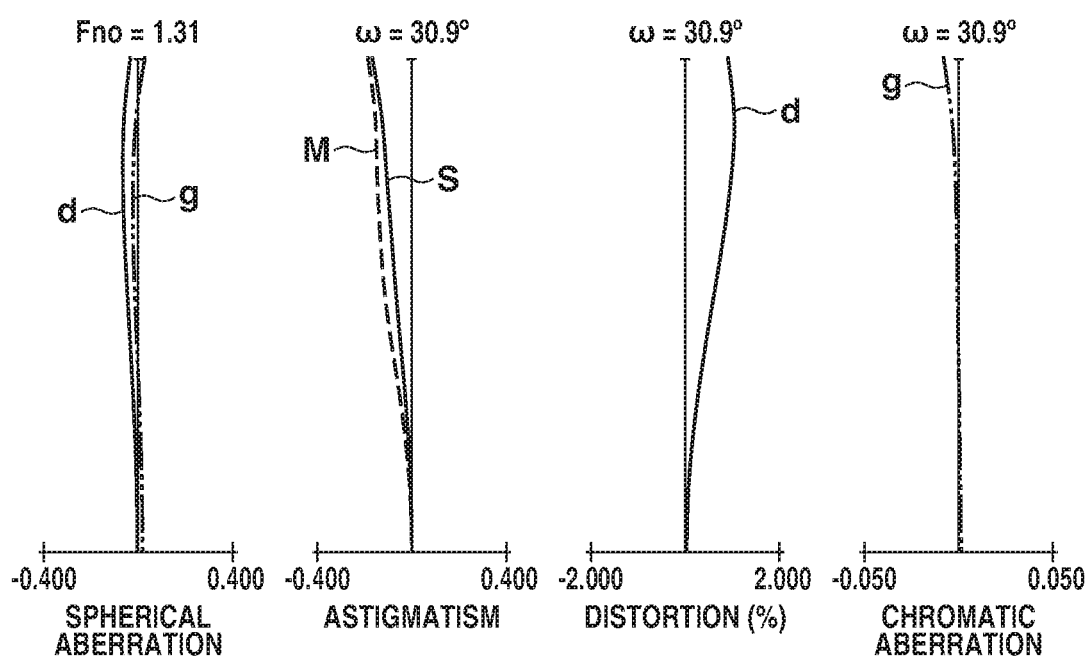
Figure 15A:
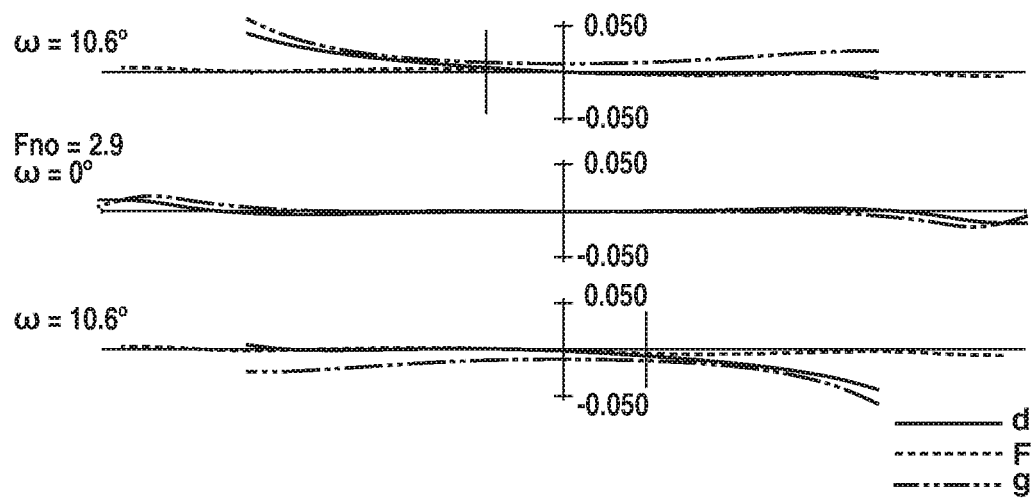
FIGS. 15A and 15B are lateral aberration diagrams of the optical system according to the fifth exemplary embodiment.
Figure 15B:
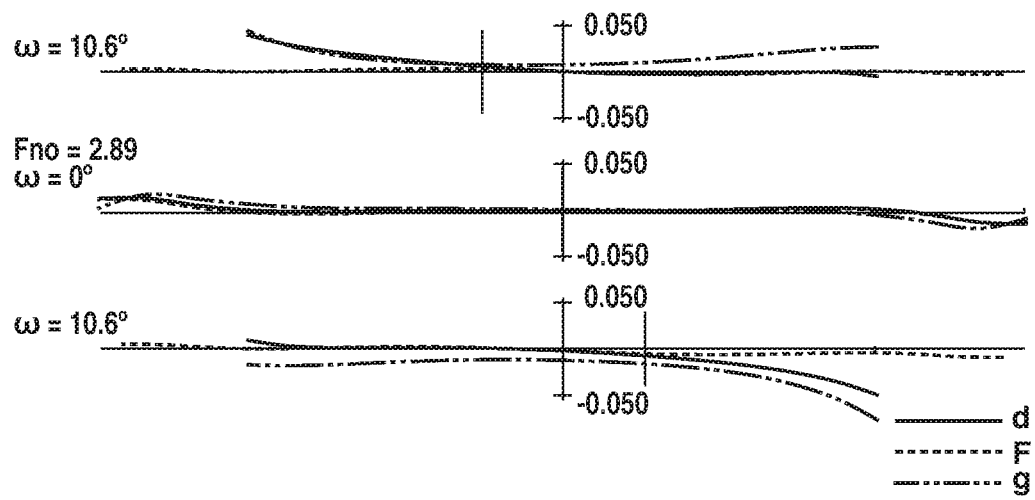

FIG. 13 is a cross-sectional view of the optical system OL according to a fifth exemplary embodiment at a time of focusing on an object at infinity. FIGS. 14A and 14B are longitudinal aberration diagrams of the optical system OL according to the fifth exemplary embodiment respectively at a time of focusing on an object at infinity and at a time of focusing on an object at the closest distance. FIGS. 15A and 15B are lateral aberration diagrams of the optical system OL according to the fifth exemplary embodiment respectively without correcting image blur and with correcting image blur in a correction angle of 0.5 degrees.

The optical systems OL according to the first to the fifth exemplary embodiments include a common main configuration and are different in types of materials used for the lenses and shapes of lens surfaces. The configuration common to the optical systems OL according to the first to the fifth exemplary embodiments is described. The optical systems OL are each an optical system having a lateral magnification (an imaging magnification) of −1.0 times.

The optical systems OL according to the first to the fifth exemplary embodiments each include a first lens unit L1 having the positive refractive power, a second lens unit L2 having the negative refractive power, a third lens unit L3 having the positive refractive power, a fourth lens unit L4 having the negative refractive power, and a fifth lens unit L5 having the negative refractive power which are arranged in order from the object side to the image plane side.

The first lens unit L1 corresponds to the object side lens unit Lp, the third lens unit L3 corresponds to the above-described intermediate lens unit, and the fifth lens unit L5 corresponds to the image plane side lens unit Ln. Further, the second lens unit L2 corresponds to the first focus lens unit LF1, and the fourth lens unit L4 corresponds to the second focus lens unit LF2. The first focus lens unit LF1 (the second lens unit L2) and the second focus lens unit LF2 (the fourth lens unit L4) are moved toward the image plane in focusing from infinity to the closest distance.

The first lens unit L1 consists of the first partial unit L1a having the negative refractive power, the second partial unit L1b having the positive refractive power, and the third partial unit L1c having the positive refractive power, and the second partial unit L1b is moved in the direction including a component in the perpendicular direction with respect to the optical axis in the image blur correction. Further, the first partial unit L1a and the third partial unit L1c are immobilized in the image blur correction.

The second partial unit L1b includes a single positive lens and a single negative lens. More specifically, according to the first, the third, and the fifth exemplary embodiments, the second partial unit L1b includes a positive lens and a negative lens arranged on the image plane side of the positive lens. According to the second and the fourth exemplary embodiments, the second partial unit L1b includes a negative lens and a positive lens arranged on the image plane side of the negative lens.

The optical systems OL according to the first to the fifth exemplary embodiments satisfy the above-described inequalities. Accordingly, the lens barrel including the optical system OL can be easily reduced in size and can satisfactorily correct image blur in the entire focus range even in close-up imaging.

Figure 16:
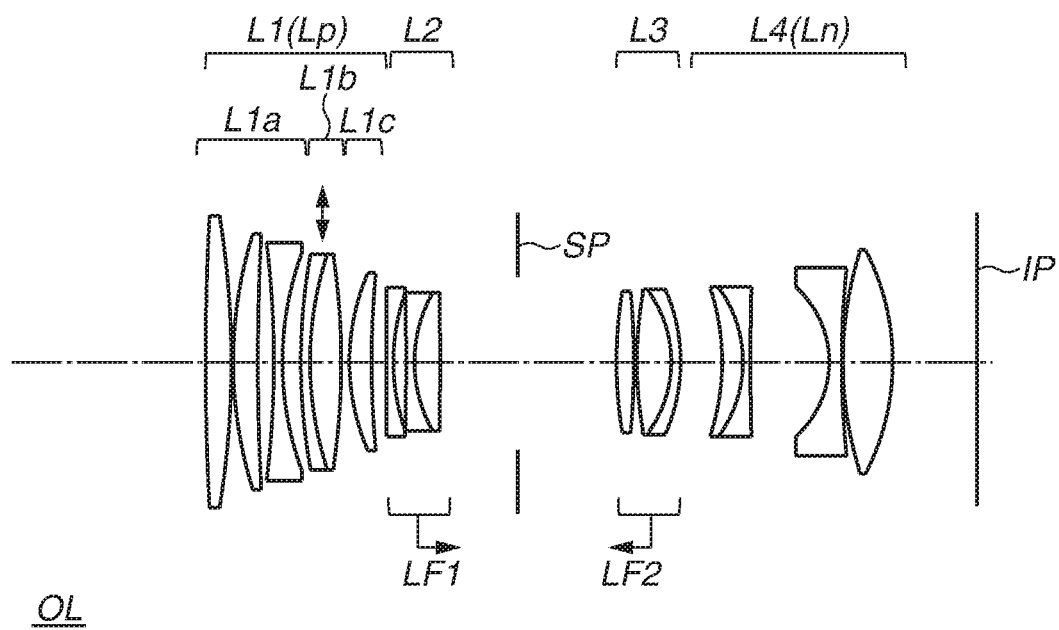
FIG. 16 is a cross-sectional view of an optical system according to a sixth exemplary embodiment.
Figure 17A:
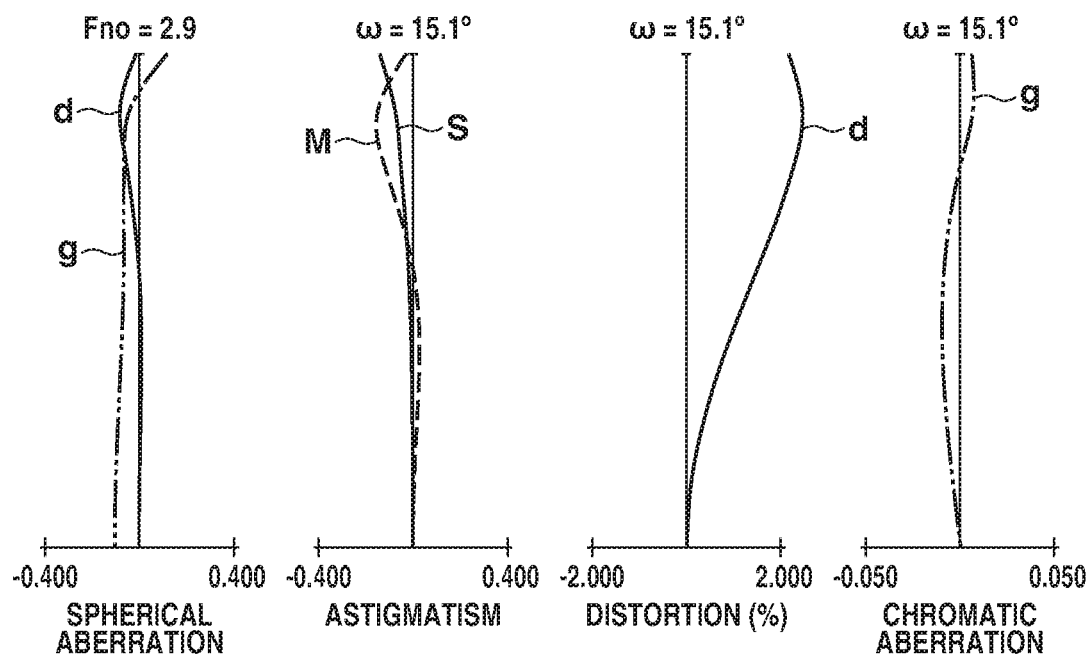
FIGS. 17A and 17B are longitudinal aberration diagrams of the optical system according to the sixth exemplary embodiment.
Figure 17B:
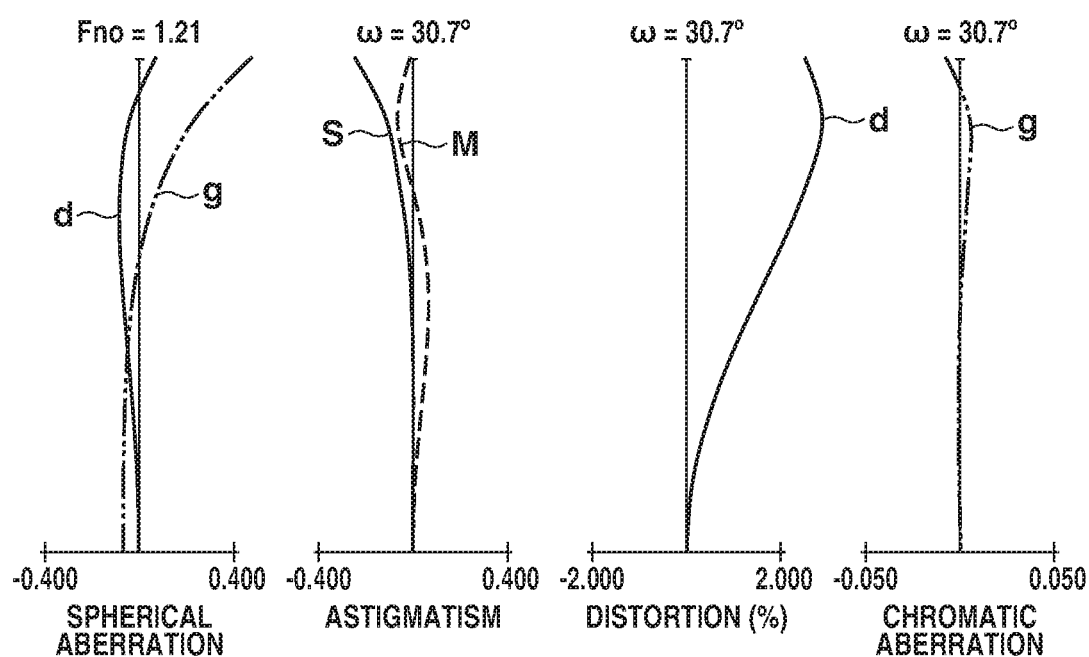
Figure 18A:
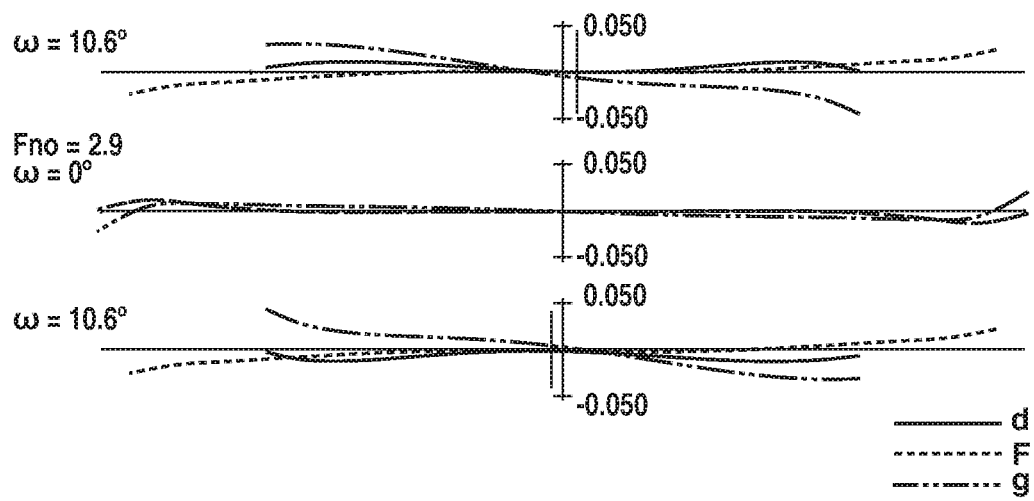
FIGS. 18A and 18B are lateral aberration diagrams of the optical system according to the sixth exemplary embodiment.
Figure 18B:
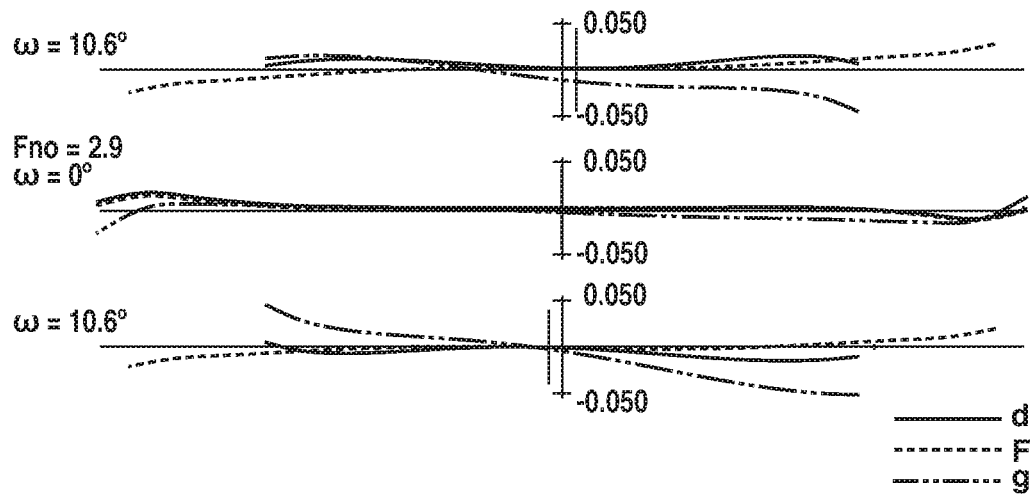

FIG. 16 is a cross-sectional view of the optical system OL according to a sixth exemplary embodiment at a time of focusing on an object at infinity. FIGS. 17A and 17B are the longitudinal aberration diagrams of the optical system OL according to the sixth exemplary embodiment respectively at a time of focusing on an object at infinity and at a time of focusing on an object at the closest distance. FIGS. 18A and 18B are the lateral aberration diagrams of the optical system OL according to the sixth exemplary embodiment respectively without correcting image blur and with correcting image blur in a correction angle of 0.5 degrees.

The optical system OL according to a sixth exemplary embodiment is the optical system having the lateral magnification (the imaging magnification) of −1.0 times.

The optical system OL according to a sixth exemplary embodiment includes the first lens unit L1 having the positive refractive power, the second lens unit L2 having the negative refractive power, the third lens unit L3 having the positive refractive power, and the fourth lens unit L4 having the negative refractive power which are arranged in order from the object side to the image plane side.

The first lens unit L1 corresponds to the object side lens unit Lp, and the fourth lens unit L4 corresponds to the image plane side lens unit Ln. Further, the second lens unit L2 corresponds to the first focus lens unit LF1, and the third lens unit L3 corresponds to the second focus lens unit LF2. The first focus lens unit LF1 (the second lens unit L2) is moved toward the image plane, and the second focus lens unit LF2 (the third lens unit L3) is moved toward the object in focusing from infinity to the closest distance.

The first lens unit L1 consists of the first partial unit L1a having the negative refractive power, the second partial unit L1b having the positive refractive power, and the third partial unit L1c having the positive refractive power. The second partial unit L1b is moved in the direction including a component in the perpendicular direction with respect to the optical axis in the image blur correction. Further, the first partial unit L1a and the third partial unit L1c are immobilized in the image blur correction.

The second partial unit L1b includes a single positive lens and a single negative lens. More specifically, the second partial unit L1b includes a negative lens and a positive lens arranged on the image plane side of the negative lens.

The optical system OL according to the sixth exemplary embodiment satisfies the above-described inequalities. Accordingly, the lens barrel including the optical system OL can be easily reduced in size and can satisfactorily correct image blur in the entire focus range even in close-up imaging.

First to sixth numerical examples are described below which respectively correspond to the first to the sixth exemplary embodiments. In the first to sixth numerical examples, a surface number indicates an order of optical surfaces from the object side. "r" is a curvature radius (mm) of an optical surface, "d" is a distance (mm) between adjacent optical surfaces, "nd" is a refractive index of a material of an optical member on a d-line, and "vd" is an Abbe number of the material of the optical member based on a d-line. The Abbe number vd is expressed as vd=(Nd−1)/(NF−NC), where NF, Nd, and NC are each a refractive index of the material with respect to an F-line (486.1 nm), a d-line (587.6 nm), and a C-line (656.3 nm), respectively. "BF" is back focus.

According to the sixth numerical example, an aspherical surface is indicated by adding an asterisk "*" on a right side of a surface number in the numerical example. An aspherical shape is expressed as a following formula:

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12}$$ [Formula 1]

where "X" is an amount of displacement from a surface vertex in the optical axis direction, "H" is a height from the optical axis in the perpendicular direction with respect to the optical axis, "R" is a paraxial curvature radius, "K" is a conic constant, and "A4", "A6", "A8", "A10", and "A12" are aspherical coefficients of respective orders. "e±x" of the aspherical coefficient means "$10^{±x}$".

Table 1 lists values corresponding to the inequalities (1) to (8) according to the respective first to sixth numerical examples.

First Numerical Example

Unit: mm
Surface Data

| Surface Number | r | d | nd | vd |
|---|---|---|---|---|
| 1 | 266.663 | 3.37 | 1.92286 | 18.9 |
| 2 | −232.817 | 0.29 | | |
| 3 | 53.243 | 3.94 | 1.53775 | 74.7 |
| 4 | 244.493 | 2.26 | | |
| 5 | −206.031 | 1.49 | 1.80810 | 22.8 |
| 6 | 38.707 | 3.57 | | |
| 7 | 113.993 | 4.63 | 1.69680 | 56.5 |
| 8 | −50.440 | 1.49 | 1.89286 | 20.4 |
| 9 | −79.587 | 1.44 | | |
| 10 | 35.848 | 3.44 | 1.72916 | 54.7 |
| 11 | 237.265 | (Variable) | | |
| 12 | −468.325 | 1.18 | 1.91082 | 35.3 |
| 13 | 42.384 | 2.30 | | |
| 14 | −133.981 | 1.00 | 1.88300 | 40.8 |
| 15 | 32.005 | 3.56 | 1.92286 | 18.9 |
| 16 | 1478.063 | (Variable) | | |
| 17 (Stop) | ∞ | 1.50 | | |
| 18 | 153.365 | 3.63 | 1.78800 | 47.4 |
| 19 | −50.098 | 0.20 | | |
| 20 | 60.117 | 5.67 | 1.67000 | 57.3 |
| 21 | −23.966 | 1.21 | 1.80518 | 25.4 |
| 22 | −68.247 | (Variable) | | |
| 23 | −52.772 | 4.32 | 2.00069 | 25.5 |
| 24 | −23.931 | 1.10 | 1.70000 | 48.1 |
| 25 | 61.920 | (Variable) | | |
| 26 | −20.736 | 1.50 | 1.96300 | 24.1 |
| 27 | 1853.066 | 0.61 | | |
| 28 | 147.374 | 7.32 | 1.78800 | 47.4 |
| 29 | −32.824 | (Variable) | | |
| Image Plane | ∞ | | | |

Various Pieces of Data

| Focal Length | 80.45 |
|---|---|
| F-number | 2.90 |
| Half Angle of View (degrees) | 15.05 |
| Image Height | 21.64 |
| Overall Lens Length | 123.69 |
| BF | 13.72 |

| | Infinity | Closest (β = −1.0) |
|---|---|---|
| d11 | 2.43 | 19.81 |
| d16 | 19.41 | 2.03 |
| d22 | 1.62 | 21.04 |
| d25 | 25.48 | 6.06 |
| d29 | 13.72 | 13.72 |

Lens Unit Data

| Unit | Starting Surface | Focal Length |
|---|---|---|
| 1 | 1 | 46.23 |
| 2 | 12 | −33.58 |
| 3 | 17 | 27.12 |
| 4 | 23 | −56.52 |
| 5 | 26 | −85.63 |

Second Numerical Example

Unit: mm
Surface Data

| Surface Number | r | d | nd | vd |
|---|---|---|---|---|
| 1 | 1141.331 | 3.12 | 2.00069 | 25.5 |
| 2 | −170.373 | 0.30 | | |
| 3 | 62.816 | 3.89 | 1.56907 | 71.3 |
| 4 | 682.652 | 2.19 | | |
| 5 | −144.504 | 1.49 | 1.75211 | 25.1 |
| 6 | 40.711 | 2.85 | | |
| 7 | 70.627 | 1.49 | 1.96300 | 24.1 |
| 8 | 46.406 | 5.02 | 1.61800 | 63.4 |
| 9 | −88.877 | 1.47 | | |
| 10 | 35.072 | 3.39 | 1.72916 | 54.7 |
| 11 | 201.856 | (Variable) | | |
| 12 | −280.066 | 1.18 | 1.88300 | 40.8 |
| 13 | 45.199 | 1.79 | | |
| 14 | −583.132 | 1.00 | 1.86300 | 41.5 |
| 15 | 24.759 | 3.51 | 1.92286 | 18.9 |
| 16 | 94.998 | (Variable) | | |
| 17 (Stop) | ∞ | 1.49 | | |
| 18 | 129.932 | 3.72 | 1.77250 | 49.6 |
| 19 | −51.020 | 0.20 | | |
| 20 | 57.349 | 5.89 | 1.64000 | 60.1 |
| 21 | −23.551 | 1.20 | 1.80518 | 25.4 |
| 22 | −58.093 | (Variable) | | |
| 23 | −48.448 | 3.50 | 2.00330 | 28.3 |
| 24 | −23.612 | 1.10 | 1.67790 | 50.7 |
| 25 | 65.890 | (Variable) | | |
| 26 | −21.027 | 1.50 | 1.96300 | 24.1 |
| 27 | 23285.436 | 0.65 | | |
| 28 | 167.356 | 7.07 | 1.83481 | 42.7 |
| 29 | −34.489 | (Variable) | | |
| Image Plane | ∞ | | | |

Various Pieces of Data

| Focal Length | 80.01 |
|---|---|
| F-number | 2.90 |
| Half Angle of View (degrees) | 15.13 |
| Image Height | 21.64 |
| Overall Lens Length | 123.65 |
| BF | 13.72 |

| | Infinity | Closest (β = −1.0) |
|---|---|---|
| d11 | 2.56 | 19.48 |
| d16 | 19.56 | 2.64 |
| d22 | 1.56 | 22.20 |

-continued

| | | |
|---|---|---|
| d25 | 27.26 | 6.62 |
| d29 | 13.72 | 13.72 |

Lens Unit Data

| Unit | Starting Surface | Focal Length |
|---|---|---|
| 1 | 1 | 46.22 |
| 2 | 12 | −30.90 |
| 3 | 17 | 26.61 |
| 4 | 23 | −58.37 |
| 5 | 26 | −91.14 |

Third Numerical Example

Unit: mm
Surface Data

| Surface Number | r | d | nd | vd |
|---|---|---|---|---|
| 1 | 111.015 | 3.47 | 1.91082 | 35.3 |
| 2 | −609.898 | 0.30 | | |
| 3 | 75.405 | 3.19 | 1.49700 | 81.5 |
| 4 | 1647.947 | 1.60 | | |
| 5 | −214.471 | 1.49 | 2.00330 | 28.3 |
| 6 | 41.903 | 3.07 | | |
| 7 | 118.024 | 4.99 | 1.86300 | 41.5 |
| 8 | −36.087 | 1.48 | 1.92286 | 18.9 |
| 9 | −74.642 | 1.42 | | |
| 10 | 34.162 | 3.38 | 1.72916 | 54.7 |
| 11 | 144.463 | (Variable) | | |
| 12 | −234.314 | 1.18 | 2.00100 | 29.1 |
| 13 | 41.516 | 2.84 | | |
| 14 | −67.027 | 1.00 | 1.88300 | 40.8 |
| 15 | 30.423 | 4.58 | 1.92286 | 18.9 |
| 16 | −103.779 | (Variable) | | |
| 17 (Stop) | ∞ | 1.49 | | |
| 18 | 220.443 | 3.71 | 1.75500 | 52.3 |
| 19 | −49.530 | 0.20 | | |
| 20 | 60.975 | 6.73 | 1.67000 | 57.3 |
| 21 | −21.397 | 1.20 | 1.75211 | 25.1 |
| 22 | −61.158 | (Variable) | | |
| 23 | −52.086 | 4.12 | 2.00069 | 25.5 |
| 24 | −22.361 | 1.10 | 1.74100 | 52.6 |
| 25 | 72.458 | (Variable) | | |
| 26 | −18.785 | 1.50 | 1.92286 | 18.9 |
| 27 | −268.678 | 0.79 | | |
| 28 | 192.811 | 7.45 | 1.77250 | 49.6 |
| 29 | −32.183 | (Variable) | | |
| Image Plane | ∞ | | | |

Various Pieces of Data

| | |
|---|---|
| Focal Length | 79.99 |
| F-number | 2.90 |
| Half Angle of View (degrees) | 15.13 |
| Image Height | 21.64 |
| Overall Lens Length | 123.88 |
| BF | 13.72 |

| | Infinity | Closest (β = −1.0) |
|---|---|---|
| d11 | 2.79 | 17.19 |
| d16 | 16.39 | 1.98 |
| d22 | 1.79 | 22.34 |
| d25 | 26.93 | 6.39 |
| d29 | 13.72 | 13.72 |

Lens Unit Data

| Unit | Starting Surface | Focal Length |
|---|---|---|
| 1 | 1 | 44.28 |
| 2 | 12 | −32.73 |
| 3 | 17 | 27.34 |
| 4 | 23 | −56.13 |
| 5 | 26 | −88.42 |

Fourth Numerical Example

Unit: mm
Surface Data

| Surface Number | r | d | nd | vd |
|---|---|---|---|---|
| 1 | −530.713 | 3.23 | 1.95375 | 32.3 |
| 2 | −109.904 | 0.27 | | |
| 3 | 55.150 | 4.13 | 1.72916 | 54.7 |
| 4 | 569.534 | 2.24 | | |
| 5 | −133.308 | 1.48 | 1.84666 | 23.8 |
| 6 | 44.470 | 2.40 | | |
| 7 | 65.506 | 1.48 | 1.96300 | 24.1 |
| 8 | 46.224 | 4.67 | 1.49700 | 81.5 |
| 9 | −98.795 | 1.46 | | |
| 10 | 39.019 | 3.16 | 1.86300 | 41.5 |
| 11 | 283.687 | (Variable) | | |
| 12 | −272.434 | 1.17 | 1.91082 | 35.3 |
| 13 | 37.118 | 2.38 | | |
| 14 | −126.260 | 1.00 | 1.88300 | 40.8 |
| 15 | 28.414 | 3.74 | 1.92286 | 18.9 |
| 16 | −10767.930 | (Variable) | | |
| 17 (Stop) | ∞ | 1.48 | | |
| 18 | 90.766 | 4.12 | 1.72916 | 54.7 |
| 19 | −49.592 | 0.20 | | |
| 20 | 52.638 | 6.20 | 1.61800 | 63.4 |
| 21 | −22.652 | 1.73 | 1.74077 | 27.8 |
| 22 | −66.439 | (Variable) | | |
| 23 | −51.024 | 4.39 | 2.00330 | 28.3 |
| 24 | −22.059 | 1.10 | 1.72600 | 53.6 |
| 25 | 61.612 | (Variable) | | |
| 26 | −19.244 | 1.50 | 1.92286 | 18.9 |
| 27 | −115.942 | 1.85 | | |
| 28 | 431.043 | 6.44 | 1.83481 | 42.7 |
| 29 | −36.890 | (Variable) | | |
| Image Plane | ∞ | | | |

Various Pieces of Data

| | |
|---|---|
| Focal Length | 80.11 |
| F-number | 2.90 |
| Half Angle of View (degrees) | 15.11 |
| Image Height | 21.64 |
| Overall Lens Length | 124.17 |
| BF | 13.72 |

| | Infinity | Closest (β = −1.0) |
|---|---|---|
| d11 | 2.42 | 19.65 |
| d16 | 19.21 | 1.98 |
| d22 | 1.64 | 17.66 |
| d25 | 25.35 | 9.33 |
| d29 | 13.72 | 13.72 |

Lens Unit Data

| Unit | Starting Surface | Focal Length |
|---|---|---|
| 1 | 1 | 45.44 |
| 2 | 12 | −29.60 |
| 3 | 17 | 26.01 |
| 4 | 23 | −52.93 |
| 5 | 26 | −106.06 |

Fifth Numerical Example

Unit: mm
Surface Data

| Surface Number | r | d | nd | vd |
|---|---|---|---|---|
| 1 | 209.874 | 3.25 | 1.92286 | 18.9 |
| 2 | −357.592 | 0.29 | | |
| 3 | 47.008 | 5.46 | 1.49700 | 81.5 |
| 4 | −255.654 | 1.18 | | |
| 5 | −173.423 | 1.50 | 1.92119 | 24.0 |
| 6 | 39.603 | 3.43 | | |
| 7 | 116.803 | 4.72 | 1.72916 | 54.7 |
| 8 | −44.409 | 1.50 | 1.84666 | 23.8 |
| 9 | −81.354 | 1.48 | | |
| 10 | 32.918 | 3.46 | 1.72916 | 54.7 |
| 11 | 182.053 | (Variable) | | |
| 12 | −187.910 | 1.20 | 1.91082 | 35.3 |
| 13 | 35.806 | 2.59 | | |
| 14 | −120.182 | 1.00 | 1.88300 | 40.8 |
| 15 | 24.607 | 4.07 | 1.92286 | 18.9 |
| 16 | 901.770 | (Variable) | | |
| 17 (Stop) | ∞ | 1.49 | | |
| 18 | 251.384 | 3.73 | 1.72916 | 54.7 |
| 19 | −47.190 | 0.20 | | |
| 20 | 50.559 | 6.65 | 1.72916 | 54.7 |
| 21 | −23.359 | 1.20 | 1.85478 | 24.8 |
| 22 | −60.433 | (Variable) | | |
| 23 | −53.874 | 4.29 | 2.00069 | 25.5 |
| 24 | −25.384 | 1.10 | 1.67003 | 47.2 |
| 25 | 62.162 | (Variable) | | |
| 26 | −20.633 | 1.50 | 2.00069 | 25.5 |
| 27 | −618.172 | 0.82 | | |
| 28 | 90.575 | 7.23 | 1.61800 | 63.3 |
| 29 | 35.673 | (Variable) | | |
| Image Plane | ∞ | | | |

Various Pieces of Data

| | |
|---|---|
| Focal Length | 80.00 |
| F-number | 2.90 |
| Half Angle of View (degrees) | 15.13 |
| Image Height | 21.64 |
| Overall Lens Length | 123.60 |
| BF | 13.72 |

| | Infinity | Closest (β = −1.0) |
|---|---|---|
| d11 | 2.73 | 17.58 |
| d16 | 16.92 | 2.06 |
| d22 | 1.50 | 20.70 |
| d25 | 25.42 | 6.22 |
| d29 | 13.72 | 13.72 |

Lens Unit Data

| Unit | Starting Surface | Focal Length |
|---|---|---|
| 1 | 1 | 43.07 |
| 2 | 12 | −26.50 |
| 3 | 17 | 25.09 |
| 4 | 23 | −61.45 |
| 5 | 26 | −56.12 |

Sixth Numerical Example

Unit: mm
Surface Data

| Surface Number | r | d | nd | vd |
|---|---|---|---|---|
| 1 | 431.764 | 4.15 | 1.92286 | 18.9 |
| 2 | −145.639 | 0.30 | | |
| 3 | 68.676 | 3.95 | 1.72916 | 54.7 |
| 4 | 379.941 | 2.57 | | |
| 5 | −157.036 | 1.38 | 1.92286 | 20.9 |
| 6 | 50.756 | 2.95 | | |
| 7 | 96.198 | 1.48 | 1.92286 | 18.9 |
| 8 | 55.437 | 5.02 | 1.72916 | 54.7 |
| 9 | −114.300 | 1.32 | | |
| 10 | 35.984 | 3.56 | 1.88300 | 40.8 |
| 11 | 153.148 | (Variable) | | |
| 12 | 1148.973 | 1.14 | 2.00100 | 29.1 |
| 13 | 33.252 | 2.03 | | |
| 14 | −488.085 | 1.35 | 1.91082 | 35.3 |
| 15 | 22.472 | 4.10 | 1.92286 | 18.9 |
| 16 | −5725.230 | 12.55 | | |
| 17 (Stop) | ∞ | (Variable) | | |
| 18 | 70.133 | 2.78 | 1.56873 | 63.1 |
| 19 | −126.945 | 0.50 | | |
| 20 | 62.985 | 5.52 | 1.48749 | 70.2 |
| 21 | −19.354 | 1.50 | 1.89286 | 20.4 |
| 22 | −28.793 | (Variable) | | |
| 23 | −37.862 | 3.35 | 1.96300 | 24.1 |
| 24 | −20.215 | 1.20 | 1.48749 | 70.2 |
| 25 | 405.417 | 12.67 | | |
| 26* | −16.038 | 2.00 | 1.80000 | 29.8 |
| 27 | 142.954 | 0.20 | | |
| 28 | 58.703 | 8.01 | 1.60311 | 60.6 |
| 29 | −39.176 | (Variable) | | |
| Image Plane | ∞ | | | |

Aspherical Surface Data 26-th surface
K = 0.00000e+000
A4 = −1.25195e−006
A6 = 2.08996e−008
A8 = 1.63810e−010

| | |
|---|---|
| Focal Length | 80.01 |
| F-number | 2.90 |
| Half Angle of View (degrees) | 15.13 |
| Image Height | 21.64 |
| Overall Lens Length | 124.16 |
| BF | 13.73 |

| | Infinity | Closest (β = −1.0) |
|---|---|---|
| d11 | 2.36 | 12.95 |
| d17 | 15.83 | 1.49 |
| d22 | 6.67 | 21.01 |
| d29 | 13.73 | 13.73 |

Lens Unit Data

| Unit | Starting Surface | Focal Length |
|---|---|---|
| 1 | 1 | 41.72 |
| 2 | 12 | −32.86 |
| 3 | 18 | 34.27 |
| 4 | 23 | −34.88 |

TABLE 1

| | First Numerical Example | Second Numerical Example | Third Numerical Example | Fourth Numerical Example | Fifth Numerical Example | Sixth Numerical Example |
|---|---|---|---|---|---|---|
| Inequality (1) | 1.010 | 0.986 | 1.375 | 0.706 | 1.028 | 0.906 |
| Inequality (2) | 0.830 | 0.836 | 0.842 | 0.840 | 0.827 | 0.824 |
| Inequality (3) | −1.875 | −1.925 | −1.718 | −2.409 | −2.183 | −2.767 |
| Inequality (4) | 1.064 | −1.139 | −1.105 | −1.324 | −0.701 | −0.436 |
| Inequality (5) | 0.337 | 0.333 | 0.342 | 0.325 | 0.314 | 0.428 |

TABLE 1-continued

|  | First Numerical Example | Second Numerical Example | Third Numerical Example | Fourth Numerical Example | Fifth Numerical Example | Sixth Numerical Example |
|---|---|---|---|---|---|---|
| Inequality (6) | 0.575 | 0.578 | 0.554 | 0.567 | 0.538 | 0.521 |
| Inequality (7) | 0.594 | 0.529 | 0.583 | 0.559 | 0.431 | −0.959 |
| Inequality (8) | 1.000 | −1.000 | −1.000 | −1.000 | −1.000 | −1.000 |

Exemplary Embodiment of Image Capturing Apparatus

Figure 19:
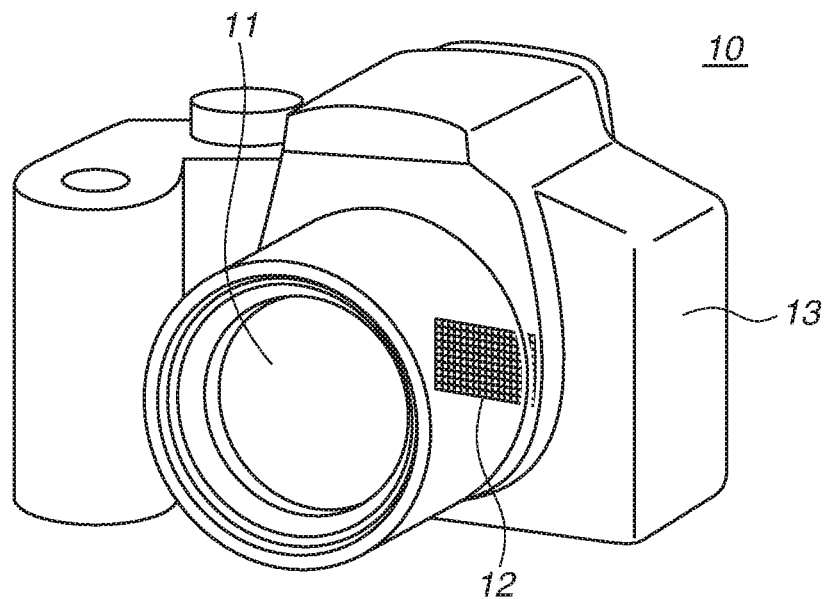
FIG. 19 illustrates a configuration of an image capturing apparatus according to an exemplary embodiment.

An image capturing apparatus according to the exemplary embodiments is described with reference to FIG. 19. FIG. 19 illustrates a configuration of an image capturing apparatus 10. The image capturing apparatus 10 includes a camera main body 13, a lens apparatus 11 including the optical system OL according to any one of the above-described first to sixth exemplary embodiments, and an image pickup element 12 which performs photoelectric conversion on an image formed by the optical system OL. As the image pickup element 12, a CCD sensor and a CMOS sensor can be used. The lens apparatus 11 may be configured to be integrated with or to be detachable from the camera main body 13.

In the image capturing apparatus 10 according to each of the exemplary embodiments, a lens barrel can be easily reduced in size, and it is beneficial to size reduction of the image capturing apparatus 10. In addition, the image capturing apparatus 10 can satisfactorily correct image blur in the entire focus range even in close-up imaging.

The image capturing apparatus 10 according to each of the exemplary embodiments can be applied to various image capturing apparatuses such as a broadcasting camera, a silver-halide film camera, and a monitoring camera without being limited to a digital still camera illustrated in FIG. 19.

While the disclosure has been described with reference to exemplary embodiments, it is to be understood that the disclosure is not limited to the described exemplary embodiments, and various combinations, modifications and changes can be made within the spirit of the claimed invention.

For example, the signs of the refractive powers of the first focus lens unit LF1 and the second focus lens unit LF2 are not limited to the ones in the above-described exemplary embodiments. Both of the first focus lens unit LF1 and the second focus lens unit LF2 may have the positive refractive power. The first focus lens unit LF1 may have the positive refractive power, and the second focus lens unit LF2 may have the negative refractive power.

For example, the sign of the refractive power of the third partial unit L1c may be negative if it is beneficial to correction of an aberration generated in the first lens unit L1.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-086267, filed Apr. 26, 2019, which is hereby incorporated by reference herein in its entirety.

What is claimed is:

1. An optical system comprising:
    an object side lens unit which is arranged closest to an object and is immobilized in focusing, the object side lens unit having a positive refractive power;
    an image plane side lens unit which is arranged closest to an image plane, the image plane side lens unit having a negative refractive power; and
    a first focus lens unit and a second focus lens unit which are arranged between the object side lens unit and the image plane side lens unit and are moved in focusing,
    wherein a distance between adjacent lens units is changed in focusing,
    wherein the object side lens unit consists of a first partial unit having a negative refractive power, a second partial unit having a positive refractive power, and a third partial unit having a positive or negative refractive power which are arranged in order from an object side to an image plane side, and
    wherein the second partial unit is moved in a direction including a component in a perpendicular direction with respect to an optical axis in image blur correction.

2. The optical system according to claim 1, wherein the third partial unit has the positive refractive power.

3. The optical system according to claim 1, wherein the following inequality is satisfied:

$$0.50 < |(1-\beta is)\beta r| < 2.00,$$

where $\beta is$ is a lateral magnification of the second partial unit, and $\beta r$ is a composite lateral magnification of all lenses arranged on the image plane of the second partial unit at a time of focusing on an object at infinity.

4. The optical system according to claim 1, wherein the following inequality is satisfied:

$$0.60 < Dis/DL < 1.00,$$

where Dis is a distance on the optical axis from a lens surface of the second partial unit on the image plane side thereof to the image plane, and DL is a distance on the optical axis from a lens surface of the object side lens unit on the object side thereof to the image plane.

5. The optical system according to claim 1, wherein the following inequality is satisfied:

$$-5.00 < FL1a/FL1b < -1.00,$$

where FL1a is a focal length of the first partial unit, and FL1b is a focal length of the second partial unit.

6. The optical system according to claim 1, wherein the following inequality is satisfied:

$$-2.00 < fn/f < 0.00,$$

where fn is a focal length of the image plane side lens unit, and f is a focal length of the optical system.

7. The optical system according to claim 1, further comprising an intermediate lens unit which is arranged between the first focus lens unit and the second focus lens unit and has a positive refractive power,
    wherein the following inequality is satisfied:

$$0.20 < fm/f < 0.60,$$

where fm is a focal length of the intermediate lens unit, and f is a focal length of the optical system.

8. The optical system according to claim 1, wherein the following inequality is satisfied:

$$0.30 < fp/f < 0.80,$$

where fp is a focal length of the object side lens unit, and f is a focal length of the optical system.

9. The optical system according to claim 1,
wherein the second focus lens unit is arranged on the image plane side of the first focus lens unit,
wherein signs of refractive powers of the first focus lens unit and the second focus lens unit are the same, and
wherein the following inequality is satisfied:

$$0.30 < ff1/ff2 < 1.00,$$

where ff1 is a focal length of the first focus lens unit, and ff2 is a focal length of the second focus lens unit.

10. The optical system according to claim 9, wherein both of the first focus lens unit and the second focus lens unit have the negative refractive power.

11. The optical system according to claim 1, wherein the following inequality is satisfied:

$$\beta \leq -0.50,$$

where $\beta$ is a lateral magnification of the optical system at a time of focusing on an object at a closest distance.

12. The optical system according to claim 1, wherein the second partial unit includes a single positive lens and a single negative lens.

13. The optical system according to claim 1, comprising a first lens unit as the object side lens unit, a second lens unit having the negative refractive power as the first focus lens unit, a third lens unit having the positive refractive power, a fourth lens unit having the negative refractive power as the second focus lens unit, and a fifth lens unit as the image plane side lens unit which are arranged in order from the object side to the image plane side.

14. The optical system according to claim 1, comprising a first lens unit as the object side lens unit, a second lens unit having the negative refractive power as the first focus lens unit, a third lens unit having the positive refractive power as the second focus lens unit, and a fourth lens unit as the image plane side lens unit which are arranged in order from the object side to the image plane side.

15. An apparatus comprising:
an optical system; and
an image pickup element which receives light of an image formed by the optical system,
wherein the optical system comprises:
an object side lens unit which is arranged closest to an object and is immobilized in focusing, the object side lens unit having a positive refractive power;
an image plane side lens unit which is arranged closest to an image plane, the image plane side lens unit having a negative refractive power; and
a first focus lens unit and a second focus lens unit which are arranged between the object side lens unit and the image plane side lens unit and are moved in focusing,
wherein a distance between adjacent lens units is changed in focusing,
wherein the object side lens unit consists of a first partial unit having the negative refractive power, a second partial unit having the positive refractive power, and a third partial unit having the positive or negative refractive power which are arranged in order from an object side to an image plane side, and
wherein the second partial unit is moved in a direction including a component in a perpendicular direction with respect to an optical axis in image blur correction.

16. The apparatus according to claim 15, wherein the third partial unit has the positive refractive power.

17. The apparatus according to claim 15, wherein the following inequality is satisfied:

$$0.50 < |(1-\beta is)\beta r| < 2.00,$$

where $\beta is$ is a lateral magnification of the second partial unit, and $\beta r$ is a composite lateral magnification of all lenses arranged on the image plane of the second partial unit at a time of focusing on an object at infinity.

18. The apparatus according to claim 15, wherein the following inequality is satisfied:

$$0.60 < Dis/DL < 1.00,$$

where Dis is a distance on the optical axis from a lens surface of the second partial unit on the image plane side thereof to the image plane, and DL is a distance on the optical axis from a lens surface of the object side lens unit on the object side thereof to the image plane.

19. The apparatus according to claim 15, wherein the following inequality is satisfied:

$$-5.00 < FL1a/FL1b < -1.00,$$

where FL1a is a focal length of the first partial unit, and FL1b is a focal length of the second partial unit.

20. The apparatus according to claim 15, wherein the following inequality is satisfied:

$$-2.00 < fn/f < 0.00,$$

where fn is a focal length of the image plane side lens unit, and f is a focal length of the optical system.

* * * * *